United States Patent
Kim et al.

(10) Patent No.: US 9,615,394 B2
(45) Date of Patent: Apr. 4, 2017

(54) MTC MONITORING METHOD

(71) Applicant: LG ELECTRONICS INC., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 14/440,024

(22) PCT Filed: Nov. 1, 2013

(86) PCT No.: PCT/KR2013/009821
§ 371 (c)(1),
(2) Date: Apr. 30, 2015

(87) PCT Pub. No.: WO2014/069927
PCT Pub. Date: May 8, 2014

(65) Prior Publication Data
US 2015/0296557 A1    Oct. 15, 2015

Related U.S. Application Data

(60) Provisional application No. 61/721,471, filed on Nov. 1, 2012, provisional application No. 61/893,906, filed on Oct. 22, 2013.

(51) Int. Cl.
*H04W 76/02* (2009.01)
*H04W 4/00* (2009.01)
*H04W 36/00* (2009.01)

(52) U.S. Cl.
CPC ......... *H04W 76/028* (2013.01); *H04W 4/005* (2013.01); *H04W 36/0005* (2013.01); *H04W 36/0033* (2013.01)

(58) Field of Classification Search
CPC ......... H04W 36/0005; H04W 36/0033; H04W 4/005; H04W 76/028; H04W 36/00; H04W 36/0016; H04B 7/18541; H04L 47/767
(Continued)

(56) References Cited

U.S. PATENT DOCUMENTS 8,565,689 B1 * 10/2013 Rubin ..................... G06F 15/16
370/232
2007/0014263 A1 * 1/2007 Ferrato ................. H04W 16/18
370/335
(Continued)

FOREIGN PATENT DOCUMENTS

KR   10-2008-0111396 A   12/2008
KR   10-2011-0081750 A    7/2011
(Continued)

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

One embodiment of the present specification provides a machine type communication (MTC) monitoring method to be implemented by a network node. The MTC monitoring method comprises the steps of: recognizing a drop of at least one bearer in a target base station by the control of a specific monitoring event when the monitoring event is satisfied according to a movement of an MTC device to be processed through one or a plurality of bearers toward a target base station of an invalid region through a packet data network (PDN) connected with a source base station; transferring, to the MTC device, information for indicating an entry into a valid region or information for indicating an activation of the bearers when detecting the escape of the MTC device from the invalid region and entrance into the valid region; and carrying out a procedure for resetting the dropped bearers.

13 Claims, 20 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2008/0200168 A1* | 8/2008 | Jiang | H04L 67/1093 455/432.1 |
| 2009/0006308 A1* | 1/2009 | Fonsen | G06F 17/30902 |
| 2010/0069021 A1* | 3/2010 | Echensperger | H04W 36/12 455/99 |
| 2010/0128613 A1* | 5/2010 | Liu | H04L 41/0681 370/252 |
| 2010/0136995 A1 | 6/2010 | Yi et al. | |
| 2011/0237178 A1* | 9/2011 | Seki | H04W 36/18 455/3.01 |
| 2012/0157050 A1 | 6/2012 | Kang et al. | |
| 2012/0264451 A1 | 10/2012 | Kim et al. | |
| 2013/0029632 A1* | 1/2013 | Tiwari | H04W 12/06 455/404.1 |
| 2013/0053023 A1* | 2/2013 | Meredith | H04W 24/08 455/423 |
| 2013/0114417 A1* | 5/2013 | Li | H04W 28/04 370/242 |
| 2013/0128797 A1* | 5/2013 | Newberg | H04L 12/1868 370/312 |
| 2014/0162661 A1* | 6/2014 | Shaw | H04W 36/22 455/439 |
| 2015/0245239 A1* | 8/2015 | Tan | H04L 41/0893 370/329 |
| 2015/0327112 A1* | 11/2015 | Kant | H04W 48/18 370/230 |

FOREIGN PATENT DOCUMENTS

KR  10-2012-0070438 A  6/2012
WO  WO 2012/044628 A1  4/2012

* cited by examiner

MTC MONITORING METHOD

CROSS REFERENCE TO RELATED APPLICATIONS

This application is the National Phase of PCT International Application No. PCT/KR2013/009821, filed on Nov. 1, 2013, which claims priority under 35 U.S.C. 119(e) to U.S. Provisional Application No. 61/721,471, filed on Nov. 1, 2012 and 61/893,906 filed on Oct. 22, 2013, all of which are hereby expressly incorporated by reference into the present application.

BACKGROUND OF THE INVENTION

Field of the Invention

The present invention relates to a Machine Type Communication (MTC) monitoring method.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and |

TABLE 1-continued

| REFERENCE POINT | DESCRIPTION |
|---|---|
| | tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address valid for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 shows a 3GPP service model for supporting MTC.

A Machine Type Communication (MTC) device may be used in a mobile communication system. MTC implies communication between one machine and another machine or between a machine to a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is collectively applied to the MTC device.

To support the MTC, although it is defined that communication is achieved through a PS network in GSM/UMTS/EPS of the 3GPP standard, a method applicable also to a CS network is described in the present specification.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 6 are now described.

In FIG. 6, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message Gate Way) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7.

TABLE 2

| Reference point | Description |
|---|---|
| Tsms | It is the reference point used by an entity outside the 3GPP system to communicate with UEs used for MTC through an SMS. |
| Tsp | It is the reference point used by an entity outside the 3GPP system to communicate with the MTC-IWF related control plane signalling. |
| T4 | A reference point used by the MTC-IWF to route device trigger to the SMS-SC in the HPLMN. |
| T5a | A reference point used between the MTC-IWF and the serving SGSN. |
| T5b | A reference point used between the MTC-IWF and the serving MME. |
| T5c | A reference point used between the MTC-IWF and the serving MSC. |
| S6m | A reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5a, T5b, and T5c is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 6.

FIG. 7 shows an example of a service via an MTC device.

The service via the MTC device may be classified into several types. For example, there is a service for collecting a variety of information by the MTC device.

Referring to FIG. 7, as an example of the aforementioned service, it is shown that a measuring service, a road information service, a user electronic device control service, etc., can be provided via the MTC device. Herein, when the MTC device collects measuring information, road traffic information, etc., and transmits it to an eNodeB, the eNodeB may transmit it to an MTC server, and an MTC user may use a provided service.

A 3GPP service model/system for supporting MTC may provide a monitoring function/service for managing the MTC device. For example, a 3GPP system may detect the following event and report the detected event to the MTC server, so that the MTC user is allowed to easily manage the MTC device.

However, a particular monitoring method has not been suggested when the MTC device moves.

SUMMARY OF THE INVENTION

An object of the present specification is to propose a method to solve the problems described above.

In order to achieve the above object, in accordance with an aspect of the present invention, there is provided a method for performing Machine Type Communication (MTC) monitoring. The method may comprise: recognizing that at least one bearer was dropped in a target base station as an MTC device, which was progressing a service through one or a plurality of bearers through a Packet Data Network (PDN) connection established via a source base station, moves to the target base station in an invalid area, as a control for a predetermined specific monitoring event; transmitting information notifying that the MTC device enters into an valid area or information instructing an activation of bearer to the MTC device, if it is detected that the MTC device gets out of the invalid area and enters into the valid area; and performing a process for setup the dropped bearer again.

If at least one of a plurality of bearers is dropped and other bearer is maintained, the information may be transmitted with being included in a handover command message or in a TAU accept message.

The step of performing the process may include: if the PDN connection is also dropped according to the drop instruction, performing a process for setup the PDN connection.

The step of transmitting the information may include: if the PDN connection is also dropped according to the drop instruction, transmitting the information instructing setup of the PDN connection.

The step of transmitting the information may include: if at least one of a plurality of bearers is dropped and Quality of Service (QoS) of other at least one bearer is lowered, transmitting information indicating to raise QoS of the other at least one bearer to a base station or another network node of the valid area.

In order to achieve the above object, in accordance with an aspect of the present invention, there is provided a method for performing Machine Type Communication (MTC) monitoring. The method may comprise: progressing a service through one or a plurality of bearers through a Packet Data Network (PDN) connection established via a source base station by an MTC device; receiving information notifying that the MTC device enters into an valid area or information instructing an activation of bearer, if the MTC device enters into the valid area again in a state that at least one bearer is dropped as the MTC device moves to the target base station in an invalid area; and performing a process for setup the dropped bearer again.

Advantageous Effects

According to the disclosure of the present specification, in case that an MTC device which is reduced/restricted in service enters into an valid area again as a satisfaction of monitoring event is detected, a method enables to restart the service is provided.

Further, by providing information of action with an MTC device, retrying invalid operation performed by the MTC device is prevented, and thereby network resources being not abused.

DESCRIPTION OF EXEMPLARY EMBODIMENTS

Figure 1:
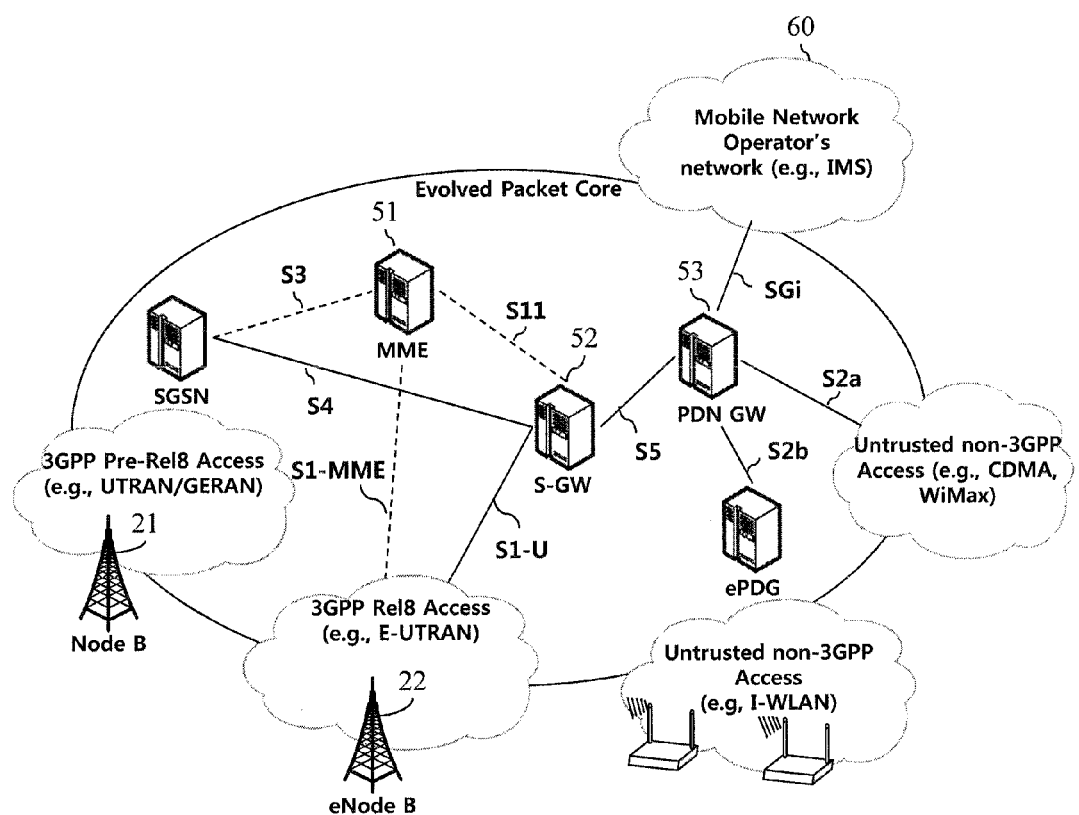
FIG. 1 shows the configuration of an evolved mobile communication network.
Figure 2:
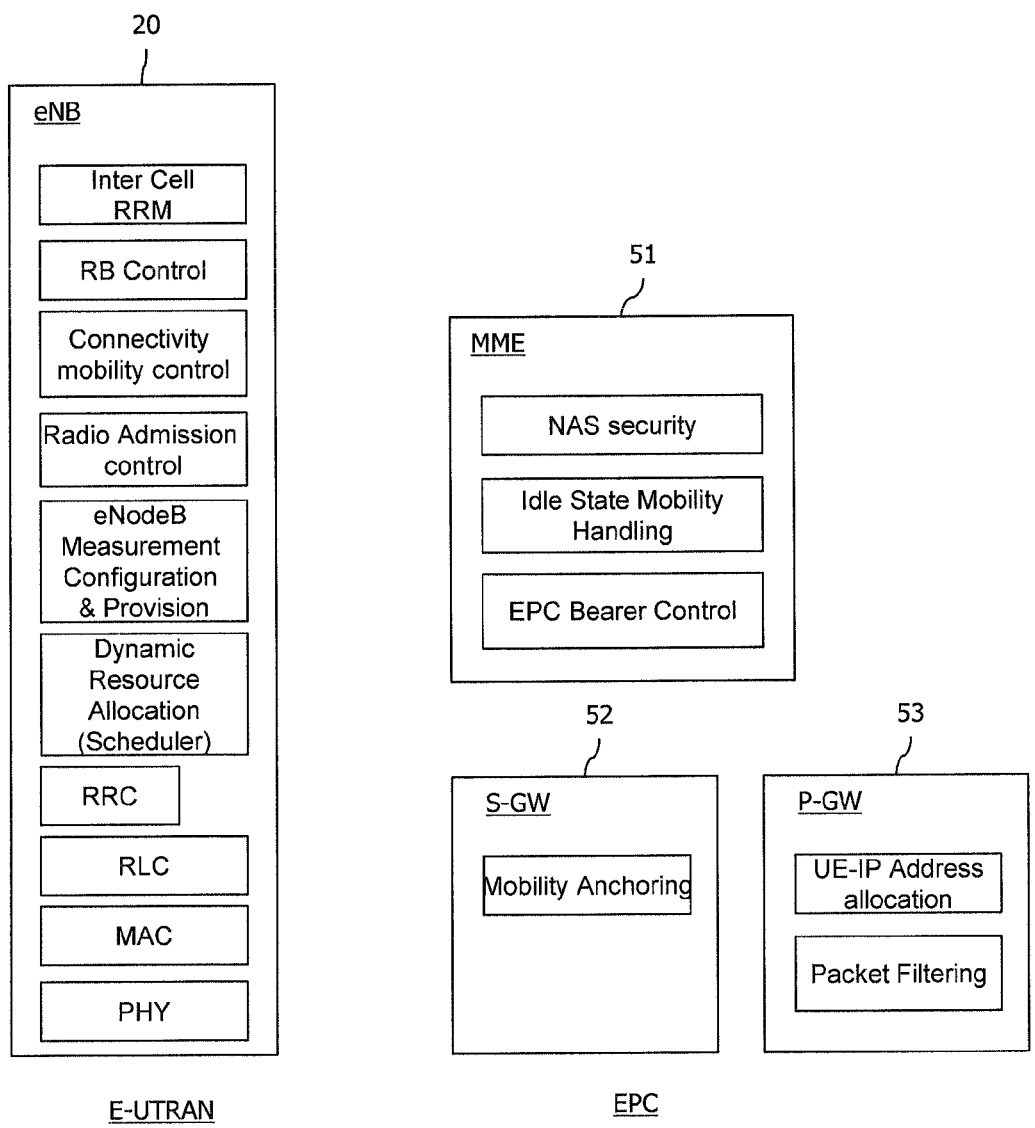
FIG. 2 is an exemplary diagram showing the architecture of a common E-UTRAN and a common EPC.
Figure 3:
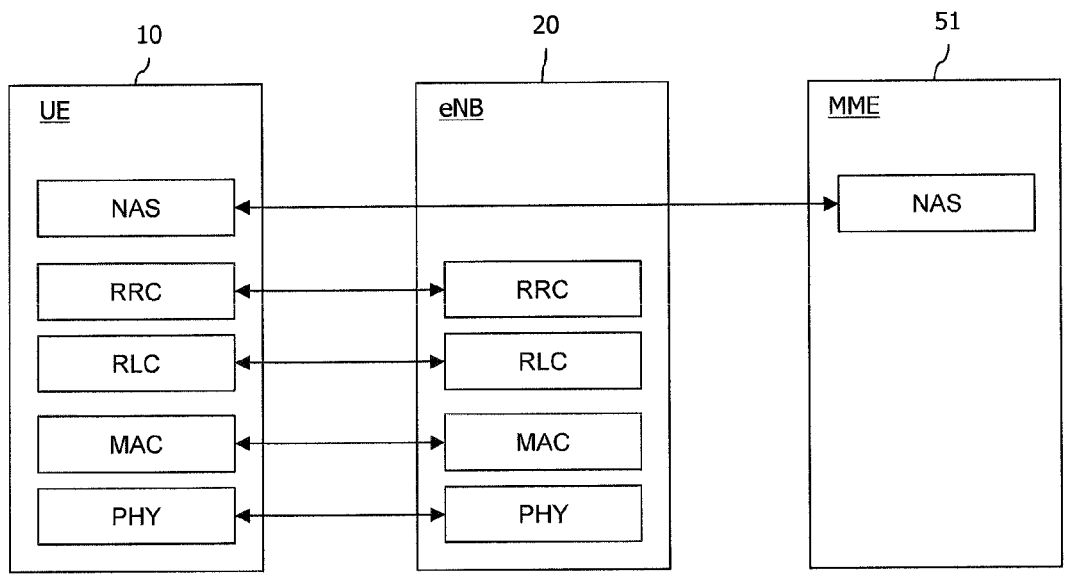
FIG. 3 is an exemplary diagram showing the structure of a radio interface protocol in a control plane between UE and an eNodeB.
Figure 4:
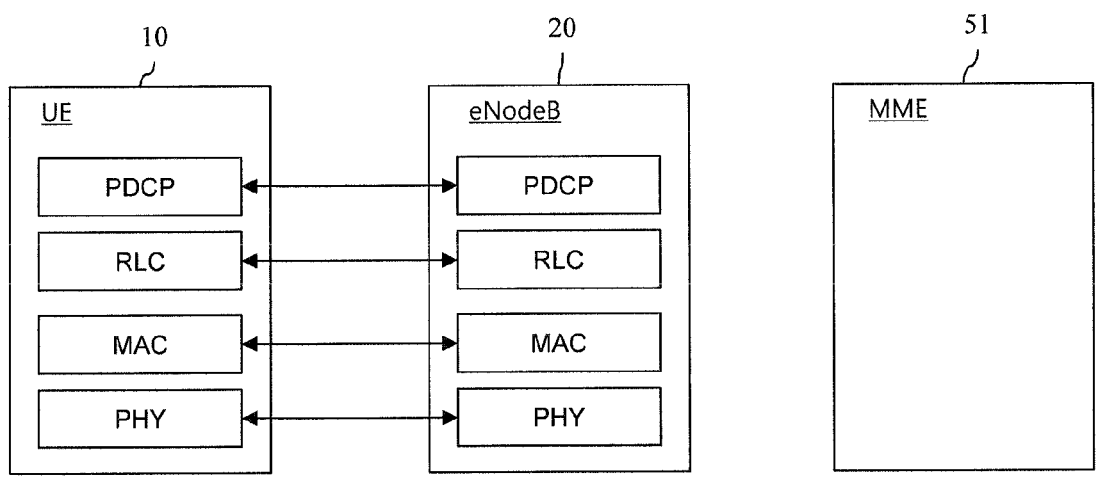
FIG. 4 is another exemplary diagram showing the structure of a radio interface protocol in a control plane between UE and an eNodeB.
Figure 5:
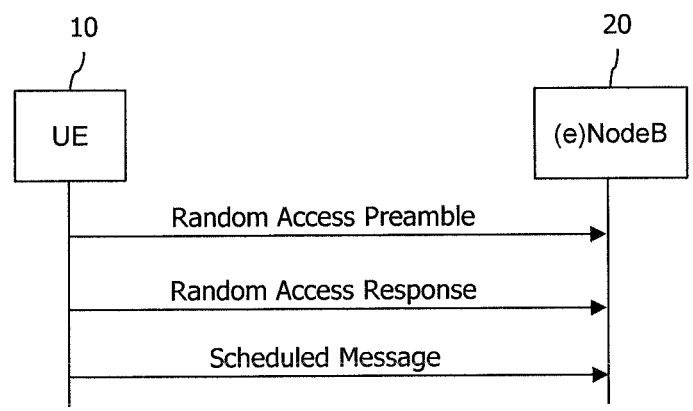
FIG. 5 is a flowchart illustrating a random access process in 3GPP LTE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

NAS (Non-Access-Stratum): A higher stratum of a control plane between a UE and an MME. The NAS supports mobility management, session management, JP address management, etc., between the UE and the network.

Meanwhile, the present invention will now be described below with reference to the foregoing drawings.

Figure 8:
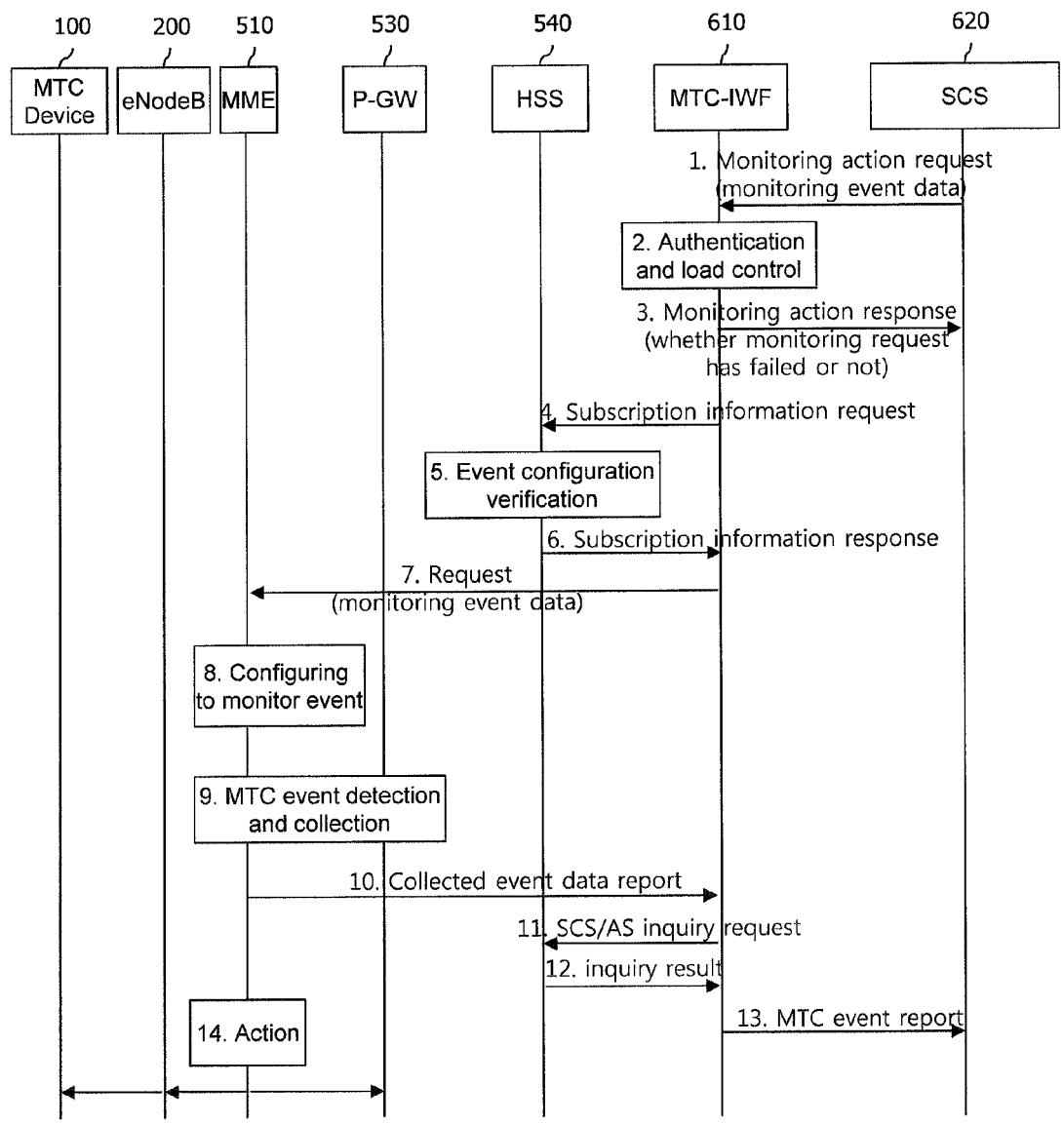
FIG. 8 is a signal flow chart showing a process of performing MTC related monitoring by a network node.

FIG. 8 is a signal flow chart showing a process of performing MTC related monitoring by a network node.

As we can know by reference to FIG. 8, it may be requested to perform MTC related monitoring by the network node. As such, the network node performs monitoring since it is more effective than the case that an MTC device 100 performs monitoring. Such MTC monitoring includes activating monitoring of a specific event and reporting it to a qualified user by detecting an event, for example, an application. If an event is detected, the network node may indicate a specific operation such as an access restriction, an allocated resource reduction, and so on.

Figure 6:
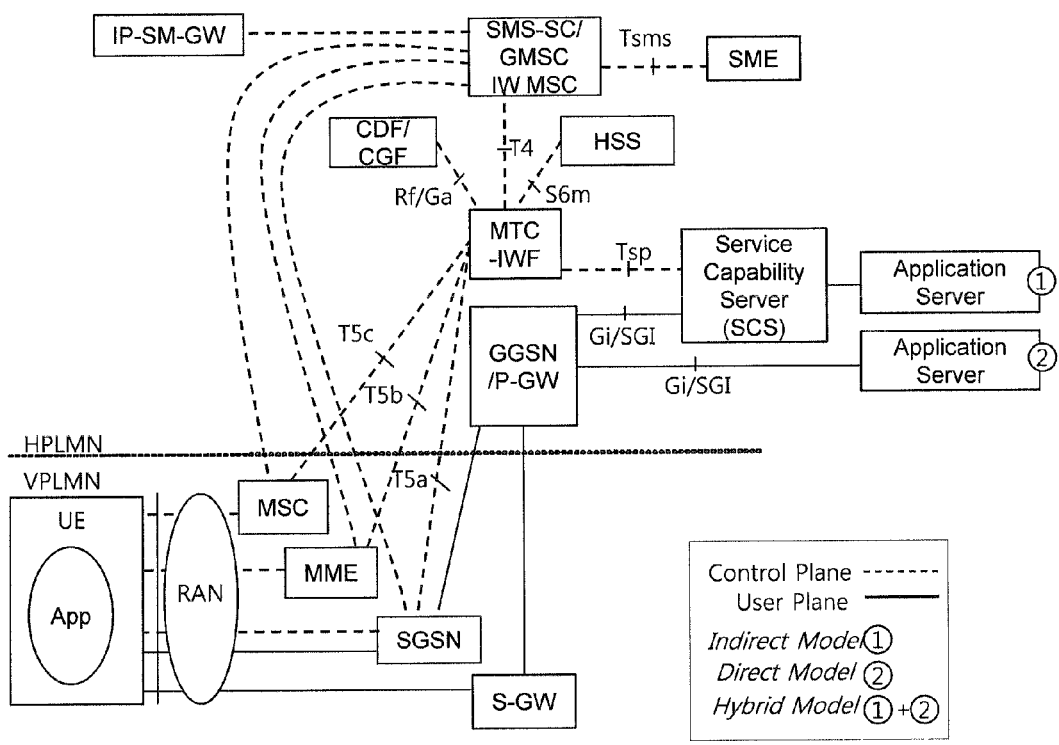
FIG. 6 shows a 3GPP service model for supporting MTC.
Figure 7:
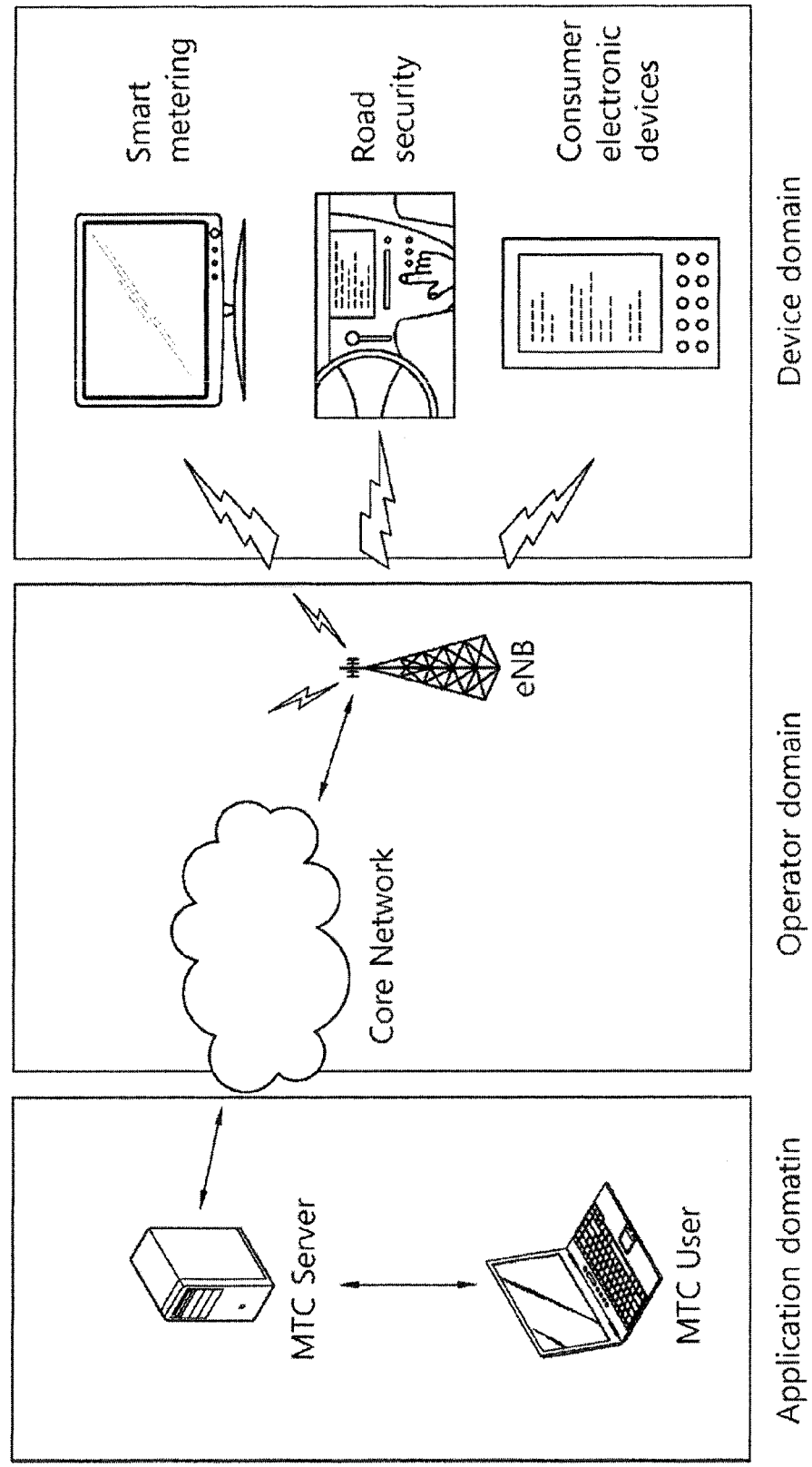
FIG. 7 shows an example of a service via an MTC device.

1) Particularly, referring to FIG. 8, in order to start monitoring, a Service Capability Sever (SCS) 620 transmits a Monitoring Action Request message to an MTC-IWF 610. The Monitoring Action Request may include information related to an event to be monitored. The information related to an event to be monitored may further include detailed information for the monitoring event, for example, a monitoring event ID and the related parameter, a monitoring event priority, a monitoring destination node, and the like. In addition, the information related to an event to be monitored may include an Action field that indicates an action to be performed when the monitoring event is satisfied. Here, the MTC-IWF 610 is a device to perform an MTC Interworking Function, is connected with an MME 510 via T5b interface as shown in FIG. 6, and is connected with the Service Capability Server (SCS) 620 via Tsp interface.

2) Upon receiving the request, the MTC-IWF 610 authenticates whether the SCS 620 is authorized to request, and confirms whether the request of the SCS 620 exceeds a predetermined allocation criteria or not.

3) As a result of the confirmation, if the request of the SCS 620 is improper, the MTC-IWF 610 transmits a Monitoring Action Response that includes a reason value that indicates the reason why the request is denied to the SCS 620. However, as a result of the confirmation, if the request of the SCS 620 is proper, the MTC-IWF 610 transmits a Monitoring Action Response that includes a value that indicates the request is approved to the SCS 620.

4) Subsequently, the MTC-IWF 610 transmits a subscriber information request message to a Home Subscription Server (hereinafter, referred to as 'HSS') 540 in order to check monitoring configuration details, for example, a monitoring event ID. Here, the monitoring event may be stored in the HSS 540 as the subscriber information.

5) The HSS 540 verifies the monitoring event information, and authenticates whether the MTC-IWF that tries to setup a network node for the monitoring is suitable.

6) And, the HSS 540 transmits the subscriber information that includes the monitoring event related information to the MTC-IWF 610.

7) The MTC-IWF 610 determines a network node to perform the monitoring based on the information received from the SCS 620 and the HSS 540. If the network node to perform the monitoring is determined to be the MME 510, the MTC-IWF 610 transmits a request that includes monitoring event data to the MME 510.

8) Upon receiving the request that includes the monitoring event data, the MME 510 is configured to monitor the event.

9) Meanwhile, the configured event may be monitored by the MME 510, but also be monitored by a P-GW 530 depending on a situation.

10) In case that the MME 510 detects and collects the event by monitoring, the report for the collected event data may be transmitted to the MTC-IWF 610.

11) The MTC-IWF 610 checks whether it is recorded in the subscriber information about who receives the report. If the information is not included in the report which is received from the MME 510, an inquiry request for the SCS 620 or an application server is transmitted.

12-13) Upon receiving an inquiry result from the HSS 540, the report for the MTC event is transmitted to the SCS 620 or the application server which is verified by the inquiry.

14) Meanwhile, if the monitored event is one of a handover or a TAU toward unsuitable region (for example, a specific eNodeB), the MME 510 performs a predefined action. For example, the MME 510 may restrict service provided to the MTC device 100.

Hereinafter, a process of handover and TAU will be described with reference to FIG. 9 and FIG. 10, respectively.

Figure 9:
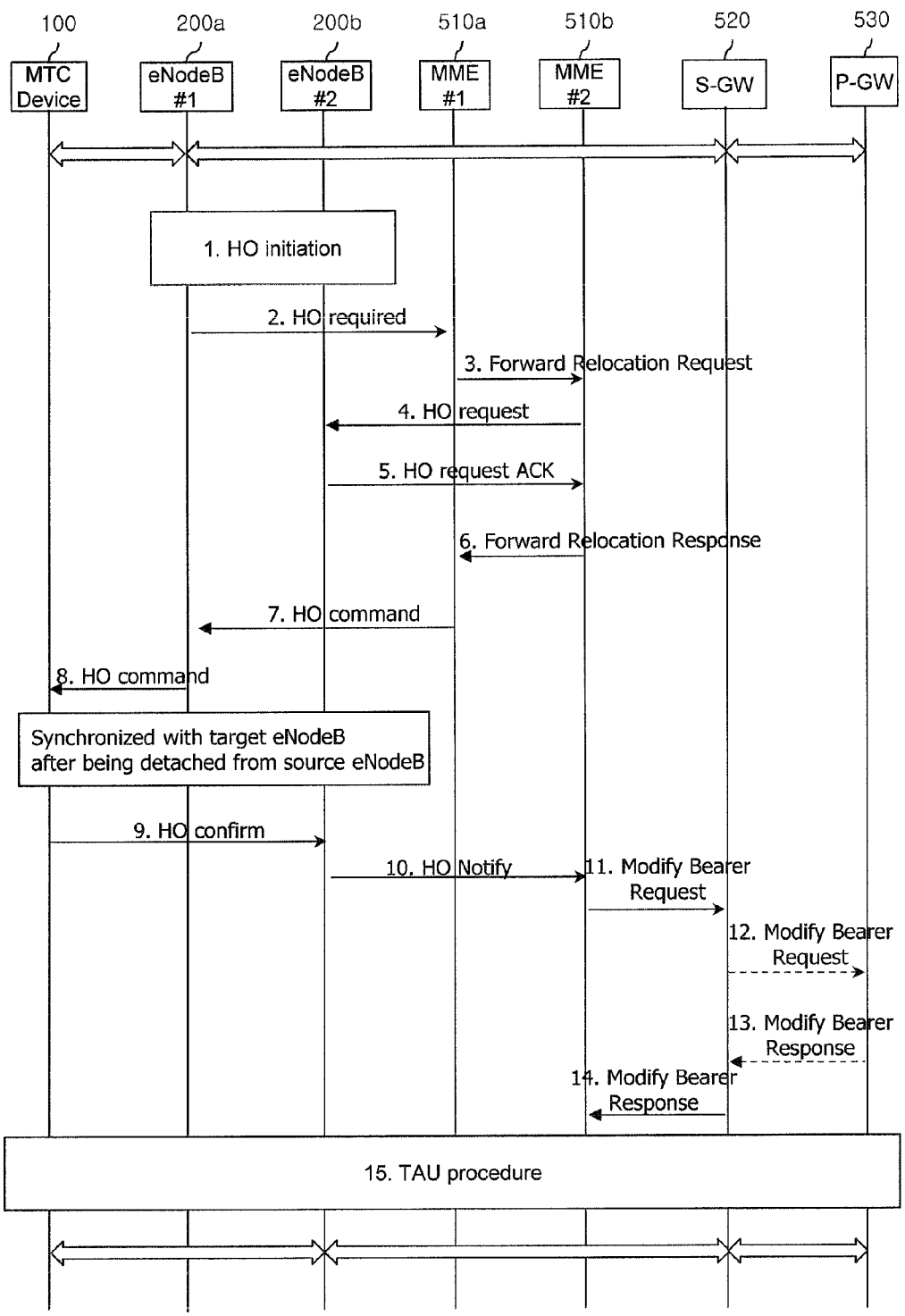
FIG. 9 shows a handover process of an MTC device.

FIG. 9 shows a handover process of an MTC device.

Referring to FIG. 9, a process that the MTC device 100 handovers to an eNodeB#2 200b while the MTC device 100 transmits and receives data with the P-GW 530 via the S-GW 520 through an eNodeB#1 200a is shown. In particular, it is described as below.

1) As the MTC device 100 moves from the coverage of the eNobeB#1 200a to the coverage of the eNodeB#2 200b, the eNodeB#1 200a decides to perform S1-based handover toward the eNodeB#2 200b.

2) And the eNodeB#1 200a notifies a situation in which handover is required by sending a handover required message (e.g., HO required message) to an MME#1 510a.

3-4) The MME#1 510a transmits a forward direction relocation request message (e.g., Forward Relocation Request message) by determining an MME#2 510b. Then, the MME#2 510b sends a handover request message (e.g., HO request message) to the eNodeB#2 200b.

5-6) After determining whether to allocate radio resources, the eNodeB#2 200b transmits a handover request acknowledgement message (e.g., HO request ACK message) to the MME#2 510b. Subsequently, the MME#2 510b transmits a forward direction relocation response message (e.g., Forward Relocation Response message) to the MME#1 510a.

7) The MME#1 510a instructs handover by sending a handover command (e.g., HO command) to the eNodeB#1 200a.

8) The MTC device 100 that receives the handover command (e.g., HO command) from the eNodeB#1 200a is detached from the eNodeB#1 200a, and performs synchronization tasks with the eNodeB#2 200b.

9) Then, the MTC device 100 sends a handover confirmation message (e.g., HO confirm message) to the eNodeB#2 200b.

10) Then, the eNodeB#2 200b notifies performing handover by transmitting a handover notification message (e.g., HO Notify message) to the MME#2 510b.

11-14) Tasks for updating bearer contexts on a network owing to the handover are performed. In particular, the MME#2 510b transmits a bearer modification request message (e.g., Modify Bearer Request message) to the S-GW 520, and receives a bearer modification response message (e.g., Modify Bearer Response message). The bearer modification process between the S-GW 520 and the P-GW 530 is performed only when it is required.

15) Meanwhile, the MTC device 100 may perform a part of Tracking Area Update (TAU) procedures in order to notify a location where the MTC device 100 moves in the last step of handover process. However, the bearer context exchange between the MME#1 510a and the MME#2 510b may be omitted since it is already performed during the handover process.

Later, the MTC device 100 may transmit and receive data with the P-GW 530 via the S-GW 520 through the eNodeB#2 200b.

Meanwhile, although it is omitted in the drawing, after the TAU procedure, a procedure for resource release between the eNodeB#1 200a and the MME#1 510a is performed.

Figure 10:
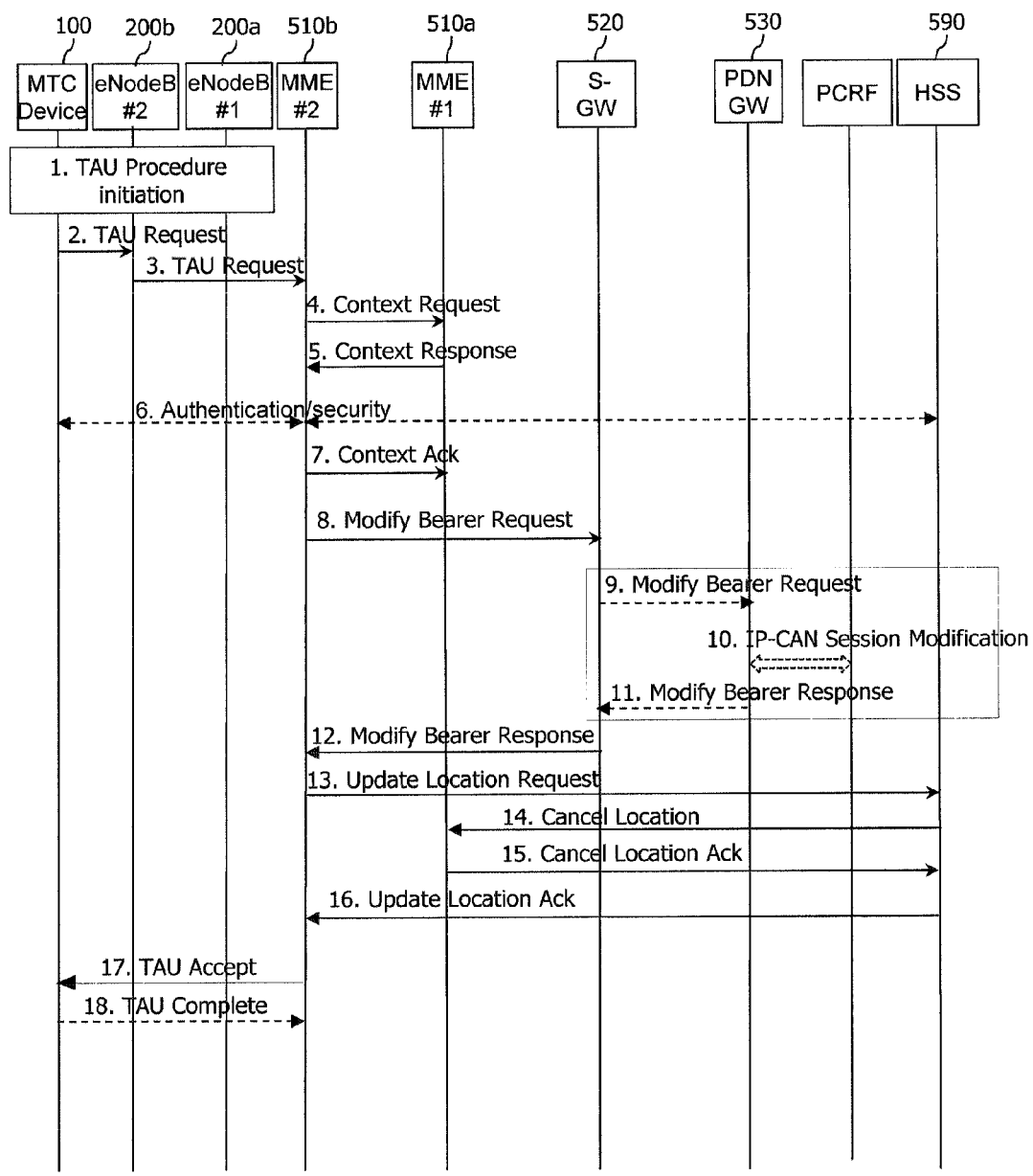
FIG. 10 is an exemplary view showing Tracking Area Update (TAU) procedures.

FIG. 10 is an exemplary view showing Tracking Area Update (TAU) procedures.

Referring to FIG. 10, in case that the MTC device 100 moves into the coverage of the eNodeB#2 200b after the MTC device 100 remains in an Idle Mode in the coverage of the eNodeB#1, the TAU procedure is performed. This will be described as below.

1) In the Idle Mode, the MTC device 100 moves into the coverage of the eNodeB#2 200b. According to this, it is determined that the Tracking Area Update (TAU) procedures are started.

2) Then, the MTC device 100 transmits a TAU request message to the eNodeB#2 200b.

3) Then, the eNodeB#2 200b determines a responsible MME. In this time, supposing that the MME#2 510b is determined to be a suitable responsible MME according to the determination as an example. The eNodeB#2 200b forwards the TAU request message to the MME#2 510b. In this time, it is assumed that the S-GW 520 is not changed.

4-5) Then, the MME#2 510b transmits a context request (e.g., Context request) message of the MTC device 100 to the MME#1 510a, and accordingly, receives a context response (e.g., Context Response) message. These are processes to obtain PDN connection related information and EPS bearer related information.

6) The MTC device 100 performs authentication/security procedures with the MME#2 510b, and the MME#2 510b performs security procedures with a HSS 590.

7) Meanwhile, the MME#2 510b transmits a context acknowledgment (e.g., Context Acknowledge) message for obtaining the context to the MME#1 510a.

Subsequently, since the S-GW 520 is not changed owing to the TAU, the MME#2 510b transmits a bearer modification request (e.g., Modify Bearer Request) message, not a session creation request (e.g., Create Session Request) message, to the S-GW 520.

9-11) Then, the S-GW 520 transmits the bearer modification request message to the PDN-GW 530 as occasion demands. The PDN-GW 530 performs IP-CAN session modification procedures as it is needed. The PDN-GW 530 transmits a bear modification response (e.g., Modify Bearer Response) message to the S-GW 520.

12) Then, the S-GW 520 transmits the bearer modification response message to the MME#2 510b.

13) Then, the MME#2 510b transmits a location update request (e.g., Update Location Request) message to the HSS 590.

14-15) Then, the HSS 590 transmits a location cancel (e.g., Cancel Location) message to the MME#1 510a, and the MME#1 510a transmits a location cancel acknowledgement (e.g., Cancel Location Ack) message to the HSS 590.

16) Then, the HSS 590 transmits a location update acknowledgement (e.g., Update Location Ack) message to the MME#2 510b.

17-18) Then, the MME#2 510b transmits a TAU accept (e.g., TAU accept) message to the MTC device 100 via the eNodeB#2 200b, and the MTC device 100 transmits a TAU complete (e.g., TAU Complete) message to the MME#2 510b if it is needed.

Figure 11:
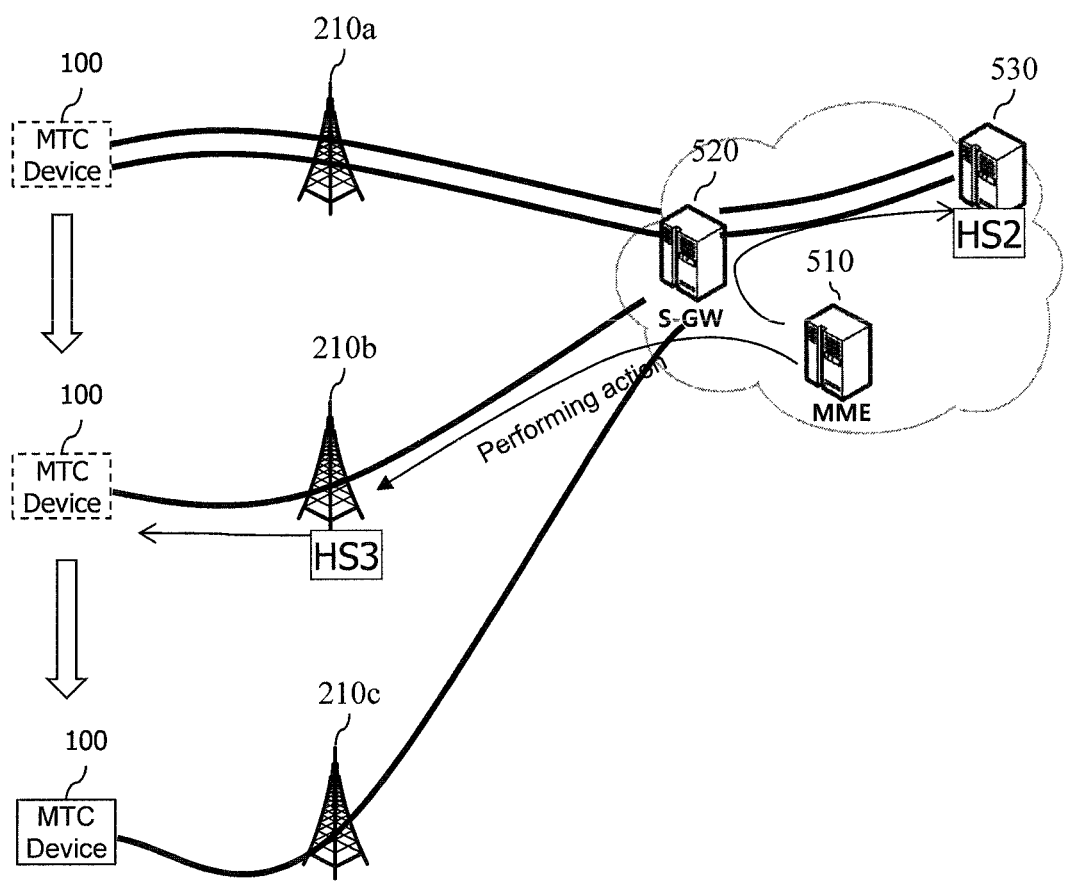
FIG. 11 shows an example of performing predefined action if a handover event is detected by the MTC monitoring.

FIG. 11 shows an example of performing predefined action if a handover event is detected by the MTC monitoring.

As described above, if the monitoring event corresponds to move to unsuitable region, and if the MME 510 monitors this, the MME 510 may restrict services by predefined action. For example, if the monitoring event corresponds to one of handover and TAU procedure into unsuitable region, and if the MME 510 detects this, the MME 510 may instruct for the P-GW 530 to lower the QoS of bearer of the MTC device 100 via the eNodeB#2 and network nodes (e.g., the S-GW 520 and the P-GW 530 via the S-GW 520). Otherwise, the MME 510 may reject the access of the MTC device 100, for example, reject handover or TAU.

As an example, as we can know by reference to FIG. 11, while the MTC device 100 establishes PDN connection with the P-GW 530 via the S-GW 520 through the eNodeB#1 210a and transmits and receives data through two bearers, the MTC device 100 moves into the predetermined coverage of eNodeB#2 210b. According to this, the handover procedures are started. Then, the MME 510 that performs MTC monitoring instructs to perform predefined action to the eNodeB#2 200b. In case that a second bearer of the MTC device 100 is not allowed to perform the instruction, the eNodeB#2 200b may drop the second bearer. And the eNodeB#2 200b may lower the QoS of a first bearer of the MTC device 100 according to the instruction.

However, as such, that is, if the QoS of the first bearer provided to the MTC device 100 is lowered or the second bearer is dropped, even though the MTC device 100 is released from satisfaction of the monitoring event (e.g., getting out of unsuitable region; as a particular example, an eNodeB in an allowed region, e.g., in case of handover to the eNodeB 210*c* shown in FIG. 11 or performing the TAU), it is not easy to higher the QoS of the first bearer of the MTC device 100 up to an original level of QoS or recover the dropped second bearer.

The reason is because the general handover procedure is objected to seamlessly move the PDN connection which is originally existed and bearer, and it is not valid to newly make the PDN connection which is not existed in the prior eNodeB and bearer, and further, to adjust the QoS of the bearer higher. However, during the general handover procedure, the original bearer may be stopped owing to the reason of overload, access limit, or the like.

As a result, in case that a satisfaction of the monitoring event is detected and a service of the MTC device 100 is limited once, even though the satisfaction is released, the MTC device 100 continuously receives the limited service for more than a predetermined time, and it is not easy to be provided with the service of original level. The MTC device 100 tries to receive the service of original level only after the MTC device 100 has data to transmit or tries to setup new PDN connection or bearer when data to transmit to the MTC device 100 arrives from a network.

However, there is a problem how many times are required for those.

Figure 12:
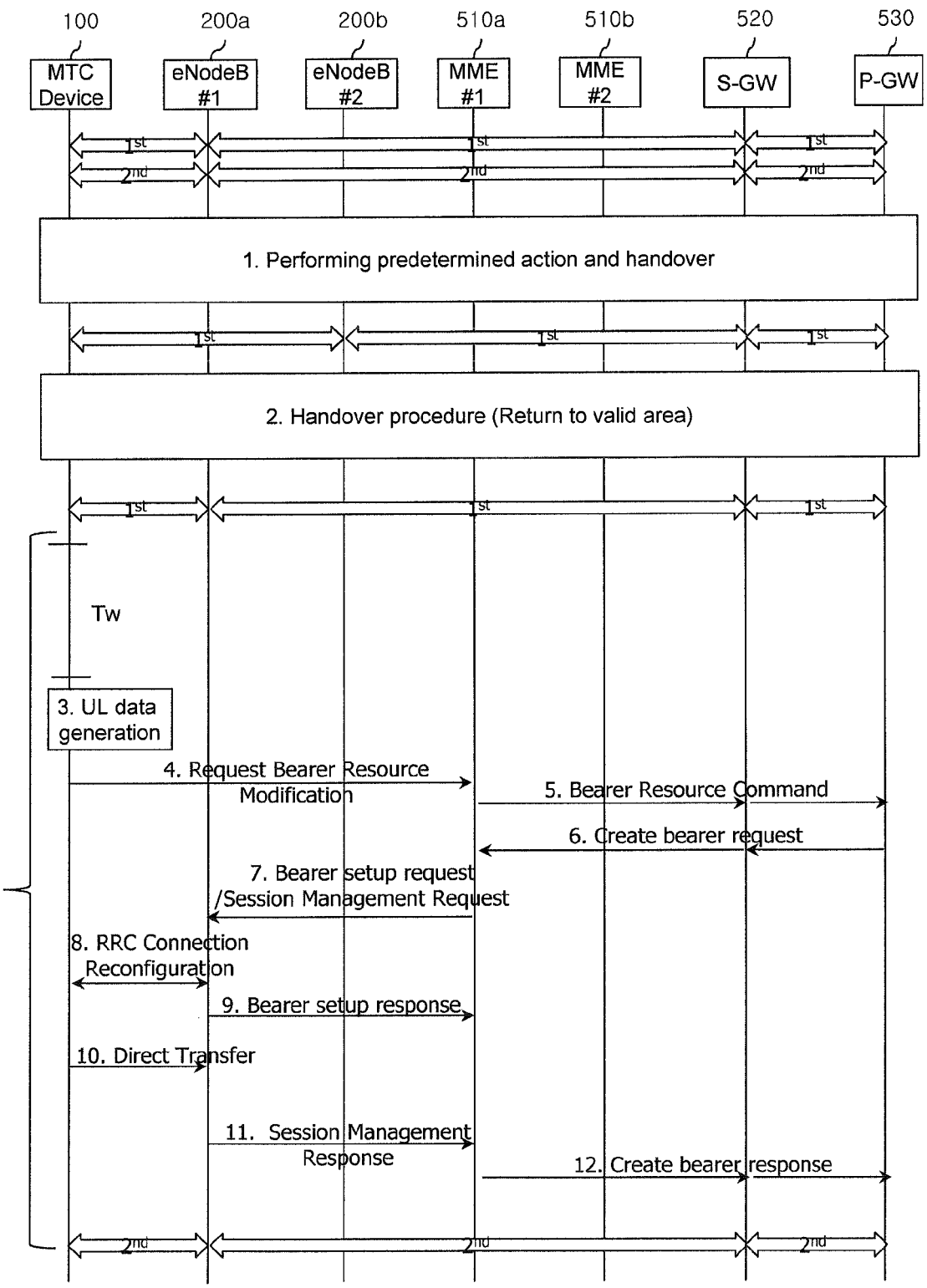
FIG. 12 is a flow chart showing the problem depicted in FIG. 11 according to an exemplary first situation.

FIG. 12 is a flow chart showing the problem depicted in FIG. 11 according to an exemplary first situation.

Referring to FIG. 12, the MTC device 100 establishes a PDN connection with the P-GW 530 via the S-GW 520 through the eNodeB#1 210*a*, and transmits and receives data through two bearers, and then, moves into the coverage of predetermined eNodeB#2 210*b*. Then, even though the handover is performed, the second bearer is dropped according to a predetermined action, and only the first bearer is transferred to the eNodeB#2 210*b*. Later, even though the MTC device 100 proceeds to handover into an eNodeB in an valid area, for example, the eNodeB#1 210*a* again, the dropped second bearer is not setup again soon, and the procedure to setup the second bearer is started only after the uplink data to transmit is generated in the MTC device 100.

These will be described below in detail.

1) Then, the second bearer is dropped by predetermined action, and handover is performed since the QoS for the first bearer becomes lowered. That is, the second bearer is dropped.

2) Later, the MTC device 100 performs handover into an eNodeB in an valid area, for example, the eNodeB#1 210*a* again.

In this time, even though the handover into the eNodeB in an valid area, for example, the eNodeB#1 210 is progressed, the dropped second bearer is not setup again soon.

3) After a certain time being passed as much as Tw, the uplink data for a predetermined service is generated in the MTC device 100.

4) Then, the MTC device 100 transmits a bearer modification request message (e.g., a Request Bearer Resource Modification message) to generate a new EPS bearer. The message is a message for requesting generation/modification/deletion of the EPS bearer. During this procedure, the message is transmitted with being signifying a generation of bearer.

5) Then, the MME#1 510*a* transmits a bearer resource command (e.g., Bearer Resource Command) to the P-GW 530 via the S-GW 520 for requesting generation of a bearer context on a network.

6) The P-GW 530 transmits a bearer generation request message (e.g., Create bearer request message) to the MME#1 510*a* via the S-GW 520. Then, a part of the bearer context information is generated on a network. Meanwhile, although it is not shown in the drawing, the P-GW 530 determines whether to generate a bearer and the corresponding QoS information according to PCRF interaction and pre-configuration information.

7) The MME#1 510*a* transmits a bearer setup request message (e.g., Bearer setup request message) to the eNodeB#1 200*a* for requesting a bearer setup in a wireless section. A session management request message (e.g., Session Management Request message) is encapsulated in the message.

8) A resource of wireless section is allocated between the MTC device 100 and the eNodeB#1 200*a* and a bearer of the wireless section is generated.

9) The eNodeB#1 200*a* transmits a bearer setup response message to the MME#1 510*a* in response to the bearer setup in the wireless section.

10) The MTC device 100 uses a direct transfer message (e.g., Direct Transfer message) to transmit a session management response message (e.g., Session management response message) to the MME#1 510*a*. That is, the session management response message is encapsulated in the direct transfer message.

11) The eNodeB#1 200*a* forwards the session management response message to notify an activation of bearer to the MME#1 510*a*.

12) The MME#1 510*a* is informed with the activation of bearer through the session management response message received from the eNodeB#1 200*a*, and transmits this to the P-GW 530 via the S-GW 520.

Then, a new EPS bearer is generated again. That is, the dropped second bearer is generated again.

As described above, a significant time is required until the second bearer is recovered. That is, in order for the second bearer to be recovered, a certain time being passed as much as Tw is required until uplink data is generated, as a precondition. And then, an additional time is required for performing a series of procedures until the second bearer is actually generated.

Figure 13:
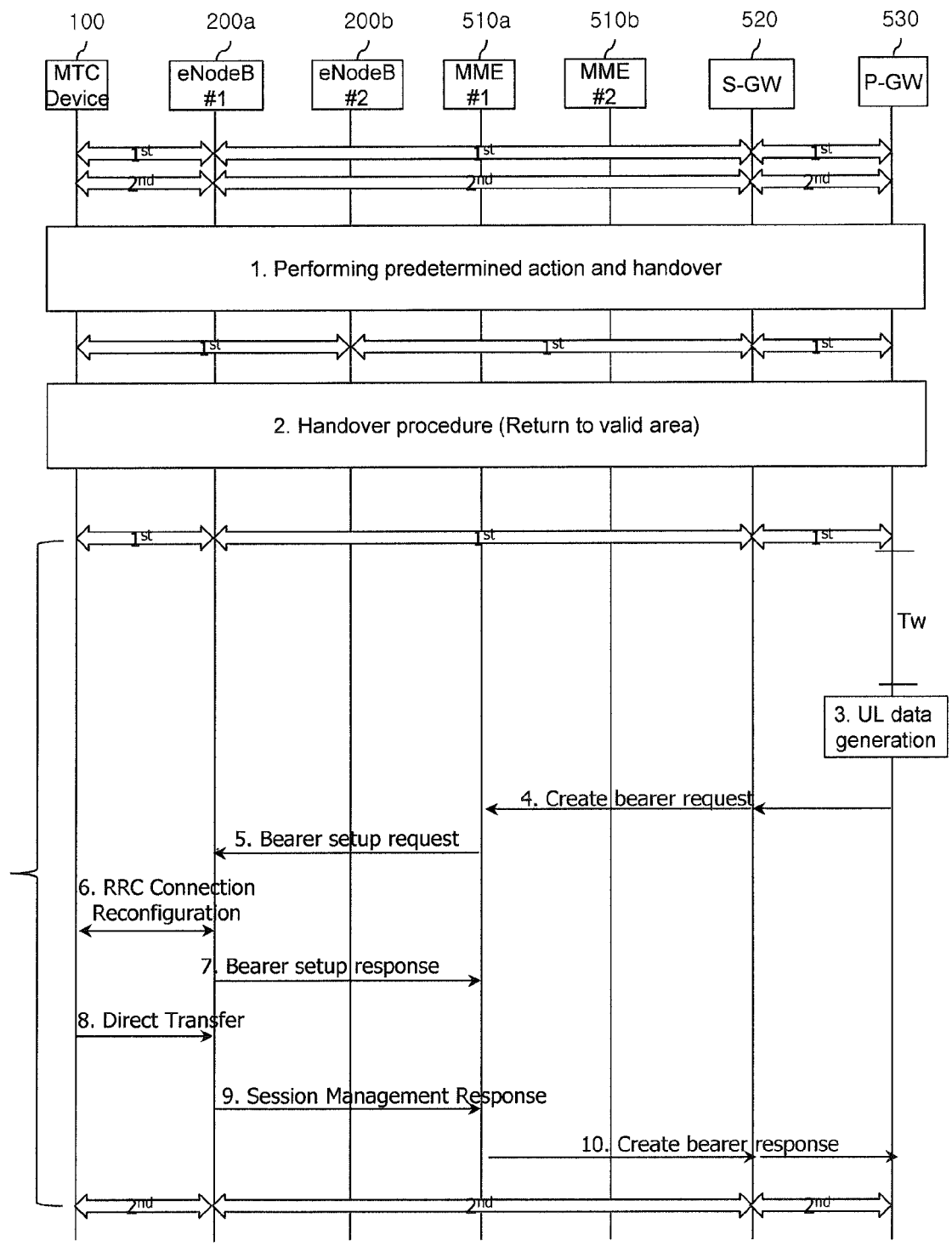
FIG. 13 is a flow chart showing the problem depicted in FIG. 11 according to an exemplary second situation.

FIG. 13 is a flow chart showing the problem depicted in FIG. 11 according to an exemplary second situation.

Referring to FIG. 13, similar to FIG. 12, even though the MTC device 100 proceeds to handover into an eNodeB in an valid area, for example, the eNodeB#1 210*a* again, the dropped second bearer is not setup again soon. However, as shown in FIG. 13, the procedure to setup the second bearer is started only after the downlink data to transmit to the MTC device 100 is generated in the P-GW 530.

Figure 14:
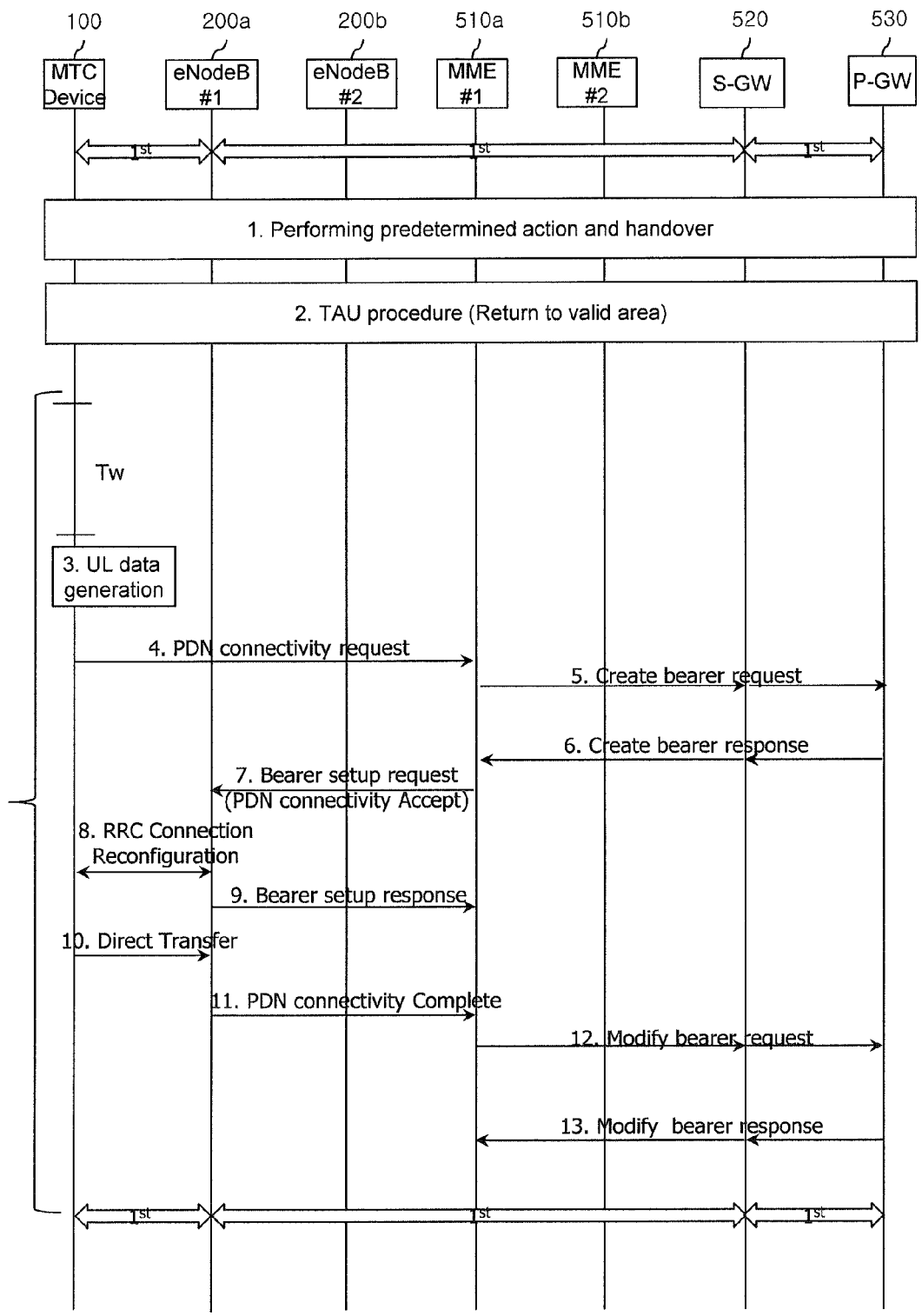
FIG. 14 is a flow chart showing the problem depicted in FIG. 11 according to an exemplary third situation.

FIG. 14 is a flow chart showing the problem depicted in FIG. 11 according to an exemplary third situation.

Referring to FIG. 14, the MTC device 100 establishes a PDN connection with the P-GW 530 via the S-GW 520 through the eNodeB#1 210*a*, and transmits and receives data through one bearer, and then, moves into the coverage of predetermined eNodeB#2 210*b*. Then, handover is rejected by a predetermined action, the PDN connection is disconnected from the bearer, and the MTC device 100 remains in an idle state. In this case, it is assumed that an instruction of a network to continuously perform the TAU procedure in the idle state to a UE even though the PDN connection and the bearer are already dropped is also the predetermined action.

Later, even though the MTC device 100 enters into an eNodeB of the valid area, for example, the eNodeB#1, since the PDN connection and the bearer are already dropped and in an idle state, only the TAU procedure is progressed. Accordingly, even though performing the TAU procedure, the disconnected PDN connection is not established, and the procedures to setup the PDN connection and the bearer are started only after the uplink data to transmit is generated in the MTC device 100. These will be described in detail below.

1) When the MTC device 100 moves into the coverage of the predetermined eNodeB#2 210*b*, the PDN connection of the MTC device 100 and the bearer are disconnected according to the predetermined action, and the MTC device 100 remains in an idle state.

2) Later, the MTC device 100 enters into an eNodeB of valid area, for example, the eNodeB#1 210*a*, and performs the TAU procedure.

3) After a certain time as much as Tw is passed, uplink data for a specific service is generated in the MTC device 100.

4) Then, the MTC device 100 transmits a PDN connection request (e.g., PDN connectivity Request message) to the MME#1 510*a*. The EPS bearer for the corresponding service is generated simultaneously with the PDN connection generation.

5-6) Then, the MME#1 510*a* transmits a bearer creation request message (e.g., Create bearer request message) to the P-GW 530 via the S-GW 520, and receives a bearer creation response message (e.g., Create bearer response message). In this time, the bearer context is generated in the P-GW.

7) The MME#1 510*a* transmits a bearer setup request message (e.g., Bearer setup request message) for requesting to setup bearer in a wireless section to the eNodeB#1 200*a*. In the message, a PDN connection acceptance message (e.g., PDN connectivity Accept message) is encapsulated.

8) A resource of wireless section is allocated between the MTC device 100 and the eNodeB#1 200*a*, and the bearer of wireless section is generated.

9) In response to the bearer setup in a wireless section, the eNodeB#1 200*a* transmits a bearer setup response message to the MME#1 510*a*.

10) The MTC device 100 uses a direct transfer message (e.g., Direct transfer message) in order to transmit a PDN connection complete message (e.g., PDN connectivity Complete message) to the MME#1 510*a*.

11) The eNodeB#1 200*a* forwards the PDN connection complete message to the MME#1 510*a* in order to notify an activation of bearer.

12-13) The MME#1 510*a* is informed with the activation of bearer through the PDN connection complete message received from the eNodeB#1 200*a*, transmits a Modify bearer request message to the P-GW 530 via the S-GW 520, and receives a Modify bearer response message.

Then, a new EPS bearer is generated again. That is, the dropped bearer is generated again.

As described above, a significant time is required until the PDN connection and the bearer are regenerated.

Figure 15:
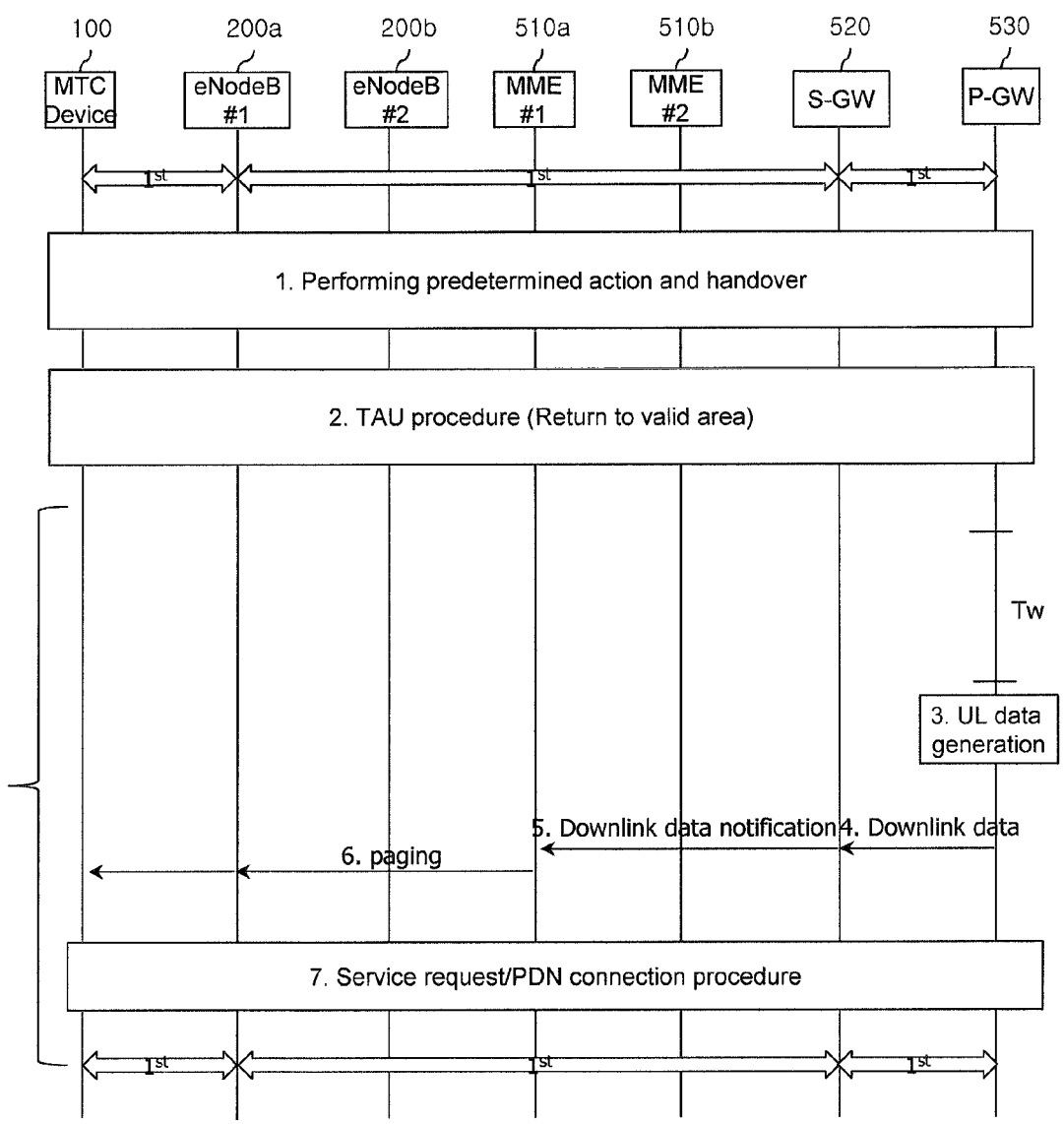
FIG. 15 is a flow chart showing the problem depicted in FIG. 11 according to an exemplary fourth situation.

FIG. 15 is a flow chart showing the problem depicted in FIG. 11 according to an exemplary fourth situation.

Referring to FIG. 15, similar to FIG. 14, even though the MTC device 100 performs the TAU procedure by entering into an eNodeB in an valid area, for example, the eNodeB#1 210*a* again, the disconnected PDN connection and the bearer are not setup again soon. However, as shown in FIG. 15, the procedure to setup the disconnected PDN connection and the bearer is started only after the downlink data to transmit to the MTC device 100 is generated in the P-GW 530.

As described so far, in case that a satisfaction of the monitoring event is detected and a service of the MTC device 100 is limited once, even though the satisfaction is released, the MTC device 100 continuously receives the limited service for more than a predetermined time, and it is not easy to be provided with the service of original level.

Accordingly, solutions to solve the problems are proposed as below.

<Brief Description for Solutions Proposed in this Specification>

The embodiments presented in this specification is to propose a method of restarting service which was reduced or restricted again by recognizing that a situation of the MTC device 100 is changed.

That is, the embodiments presented in this specification are to propose a method for recovering a level of service by the MTC device 100 as soon as a satisfaction of event is released.

The methods according to the embodiments presented in this specification include a combination of one or more of followings.

1. In case that an action performed according to a satisfaction of monitoring event (e.g., handover to an eNodeB in a restricted area) is to restrict a service provided to the MTC device 100 (i.e., lowering the QoS), a network node (e.g., MME/SGSN) that performs monitoring performs a bearer modification procedure accompanied by a QoS update (e.g., lowering).

In this time, according to an embodiment, a network node (e.g., MME/SGSN) preserves information of an existing bearer. This information may be stored in another network node such as HSS/PCRF except the network node (e.g., MME/SGSN) that performs monitoring.

Alternatively, the information of the existing bearer may be forwarded to the MTC device 100. The information that may be included in this information may be one or more of the information listed in Table below, or even though the information does not includes explicit contents, the information let a UE know that in a form of implicit information.

TABLE 3

Information indicating that a satisfaction of a specific monitoring event is detected or information indicating which monitoring event is detected in particular
Information indicating that the QoS is changed as a result of performing action or information indicating which change was presented in particular
Information indicating that the corresponding procedure is performed as a result of performing the action Meanwhile, in case that the MTC device 100 enters into an valid area by getting out of the restricted area (i.e., in case of performing handover to an eNodeB of an valid area), a network node or the MTC device 100 performs an operation of recovering QoS (e.g., raising the QoS) of the bearer.

For this, a network node, for example, the MME 510 may notify that recovery of the QoS (e.g., raising the QoS) of the bearer is valid to the MTC device 100. The MTC device 100 that receives the notice may transmit the request for recovering the QoS (e.g., raising the QoS) of the bearer to the network node.

Alternatively, the network node may not directly notify it to the MTC device 100, but may perform a procedure for recovering the QoS (e.g., raising the QoS) of the bearer, for example, a bearer modification procedure or a bearer activation procedure.

2. In case that an action performed according to a satisfaction of monitoring event (e.g., handover to an eNodeB in a restricted area) is to restrict an access of the MTC device 100, a network node (e.g., MME/SGSN) that performs monitoring, for example, may reject the handover or the TAU for rejecting an access of the MTC device 100. According to this, the bearer of the MTC device 100 may be dropped.

In this time, according to an embodiment, a network node (e.g., MME/SGSN) preserves information of an existing bearer. This information may be stored in another network node such as HSS/PCRF except the network node (e.g., MME/SGSN) that performs monitoring.

Alternatively, the information of the existing bearer may be forwarded to the MTC device 100. The information that may be included in this information may be one or more of the information listed in Table below, or even though the information does not includes explicit contents, the information let a UE know that in a form of implicit information.

TABLE 4

Information indicating that a satisfaction of a specific monitoring event is detected or information indicating which monitoring event is detected in particular
Information indicating that the corresponding procedure is performed as a result of performing the action The MTC device 100 that receives the information should not retry the TAU or the handover in the same location/the same situation. And the MTC device 100 may maintain black list/white list and so on. If the MTC device 100 retries it, the network node may perform more active action based on the information. For example, if the MTC device 100 tries several times, the network node may perform detach, or the like.

Meanwhile, in case that the MTC device 100 enters into an valid area by getting out of the restricted area (i.e., in case of performing handover to an eNodeB of an valid area), a network node or the MTC device 100 performs an operation to recover the dropped bearer.

For this, a network node, for example, the MME 510 may notify that the corresponding request is useful request. In case that the MTC device 100 receives the information shown in Table 2, the MTC device 100 updates the information.

Alternatively, the network node does not notify it directly to the MTC device 100, but updates the stored information. That is, by deleting records for the situation in which problems occurs on a specific MTC device 100, it is processed that the corresponding MTC device 100 operates normally. If the information is stored in the HSS, the network node transmits a request for updating the information.

Hereinafter, referring to FIG. 16 to FIG. 19, the embodiments presented in this specification will be described. The situations shown in FIG. 16 to FIG. 19 are assuming that the MTC device 100 transmits many kinds of data, for example, mass recorded data (for recording purpose) consistently checked and data (for notice purpose) sending signals for emergency situation.

In this time, it is assumed that if handover occurs when the MTC device 100 moves from a location while the MTC device 100 is on transmitting data in an valid condition (valid area or valid time), the condition of monitoring event is satisfied and a predetermined action is performed.

According to the predetermined action, a bearer for transmitting the mass recorded data may be dropped or of which QoS is lowered, and only the bearer for transmitting signals for emergency situation is handed over.

Meanwhile, a granularity according to service operation may be performed in a PDN unit and a bearer unit (in case of processing with different bearers or the same bearer).

According to the PDN unit, if the PDN in which the mass recorded data is stored and the PDN that processes the signals for emergency situation are different depending on the service operation, a connection to a specific PDN may be released, and another PDN connection is maintained and handed over. According to the bearer unit, a non-GBR bearer for transmitting the mass recorded data is dropped and a GBR bearer for transmitting the signals for emergency situation is handed over depending on the service operation. According to the bearer unit (processed with the same bearer), depending on the service operation, it may be handed over after lowering the QoS of entire bearer.

Figure 16:
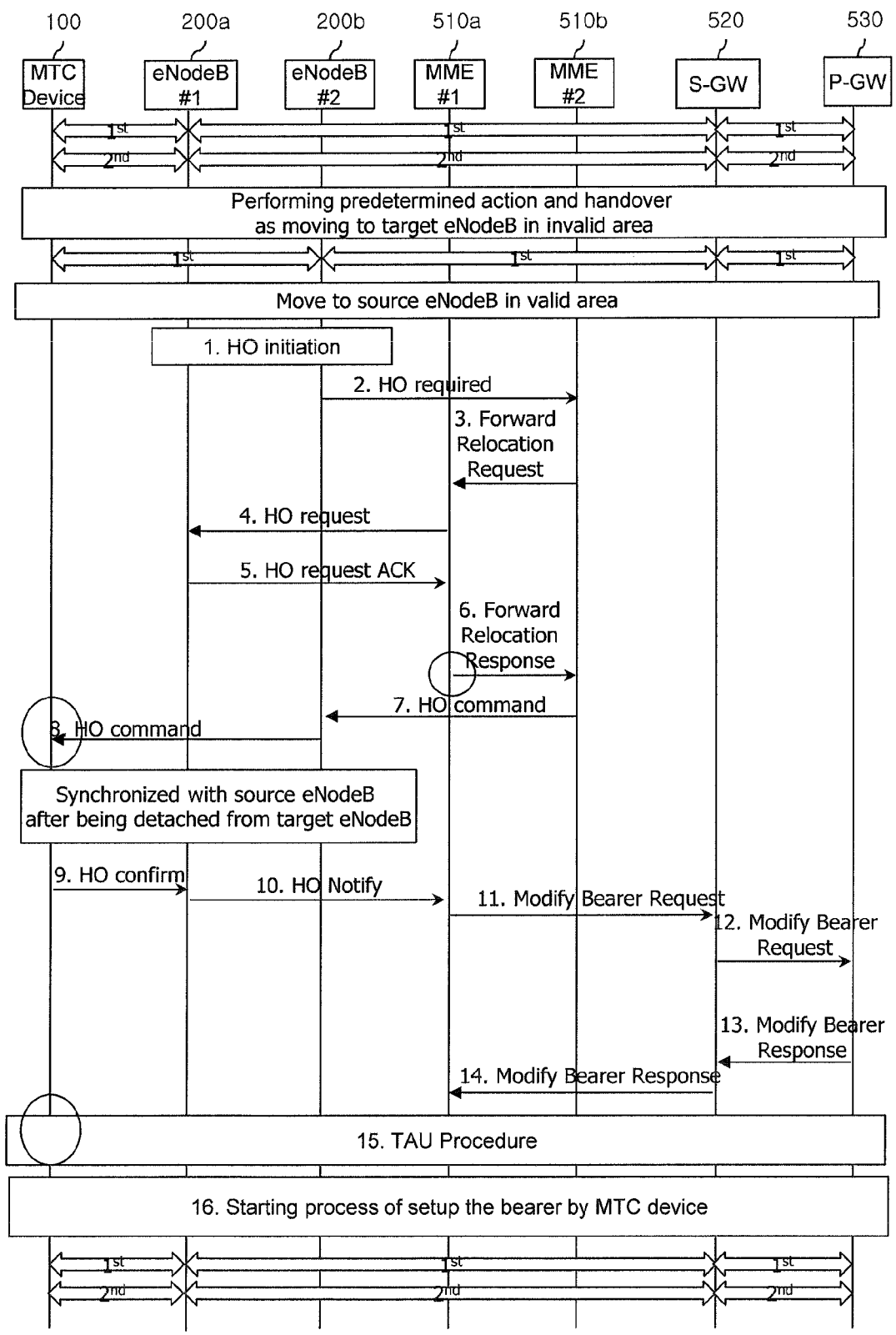
FIG. 16 is a flow chart showing a solution according to a first embodiment of the present specification.

FIG. 16 is a flow chart showing a solution according to a first embodiment of the present specification.

Referring to FIG. 16, while the MTC device 100 establishes PDN connection with the P-GW 530 via the S-GW 520 through the eNodeB#1 210*a* and transmits and receives data through two bearers, the MTC device 100 moves into the predetermined coverage of eNodeB#2 210*b*. Then, even though the handover is performed, the second bearer is dropped according to a predetermined action, and only the first bearer is transferred to the eNodeB#2 210*b*.

Later, if the MTC device 100 moves to an eNodeB in an valid area, for example, the eNodeB#1 210*a*, the MTC device 100 performs the procedure for regenerating the second bearer which was dropped, even before the uplink data is generated. In addition, the QoS for the first bearer of the MTC device is controlled.

Similar processes to FIG. 9 to FIG. 15 are not described among the depicted processes, and only different processes are will be described as below.

Depicted process 6: In a situation of entering into an valid area, the MME#1 510 recognizes that the second bearer of the MTC device 100 was dropped due to performing a previous monitoring action, and the current first bearer of the MTC device 100 is not adequate. That is, the MME#1 510*a* recognizes it based on the history information of monitoring received from the MME#2 510*b* or based on the information directly/indirectly received from subscriber information and another network node (e.g., an MTC server or a network node in charge of a specific function for monitoring). Therefore, as the MTC device 100 enters into the eNodeB#1 200*a* of valid area again, the MME#1 510 sends the information implicitly indicating entering into the eNodeB#1 200*a* of valid area or the information indicating a bearer activation to the MME#2 510*b*, and the MME#2 510*b* forwards the information with being included in the handover command (HO command) to the eNodeB#2 200*b*. The handover command (HO command) may include information to increase or decrease the QoS of bearer.

Depicted process 8: The eNodeB#2 200*b* forwards the handover command (HO command) to the MTC device 100. Then, the MTC device 100 may immediately perform a bearer setup process together with synchronization of target cell based on the information in the handover command message, or may immediately perform the bearer setup process after recognizing based on the information, as shown in the drawing, and after completing the TAU procedures via the eNodeB#1/MME#1.

Depicted process 15: In the process 7, the information forwarded to the MTC device 100 may be transmitted with being included in the TAU accept message.

Depicted process 16: The MTC device 100 starts the process of setup the bearer which was dropped even before uplink data is generated, and later, may immediately transmit the data without delayed time if the uplink/downlink data transmission is required.

Figure 17:
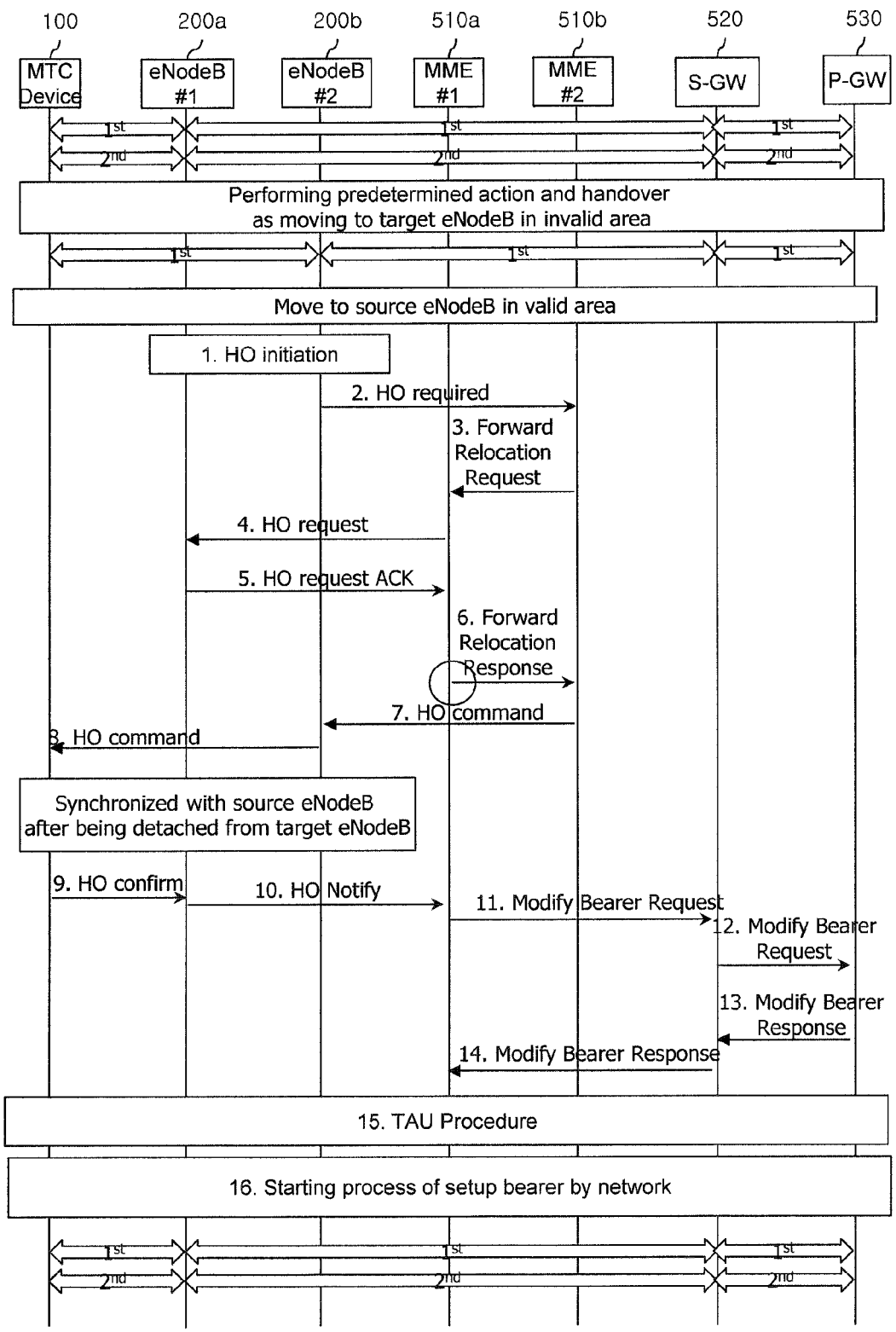
FIG. 17 is a flow chart showing a solution according to a second embodiment of the present specification.

FIG. 17 is a flow chart showing a solution according to a second embodiment of the present specification.

Referring to FIG. 17, similar to FIG. 16, while the MTC device 100 establishes two bearers with the P-GW 530 via the S-GW 520 through the eNodeB#1 210*a* and transmits and receives data through two bearers, the MTC device 100 moves into the predetermined coverage of eNodeB#2 210*b*. Then, even though the handover is performed, the second bearer is dropped according to a predetermined action, and only the first bearer is transferred to the eNodeB#2 210*b*.

Later, if the MTC device 100 moves to an eNodeB in an valid area, for example, the eNodeB#1 210*a*, a network performs the procedure for regenerating the second bearer which was dropped, even before the uplink data is generated.

Similar processes to FIG. 9 to FIG. 15 are not described among the depicted processes, and only different processes are will be described as below.

Depicted process 6: In a situation of entering into an valid area, the MME#1 510 recognizes that the second bearer of the MTC device 100 was dropped due to performing the previous monitoring action, and the current first bearer of the MTC device 100 is not adequate. That is, the MME#1 510*a* recognizes it based on the history information of monitoring received from the MME#2 510*b* or based on the information directly/indirectly received from subscriber information and another network node (e.g., an MTC server or a network node in charge of a specific function for monitoring).

In order to generate the bearer which was dropped owing to MME#1 or another network node, the network-initiated bearer setup procedure of the conventional art may be immediately performed in parallel, or may be performed after the TAU procedure via the eNB#1/MME#1 which is the last step of handover (depicted process 16).

Depicted process 8: The eNodeB#2 200*b* forwards the handover command (HO command) to the MTC device 100.

Depicted process 16: In the network, the process of setup the bearer which was dropped even before downlink data is generated is started, and later, may immediately transmit the data without delayed time if the uplink/downlink data transmission is required.

Figure 18:
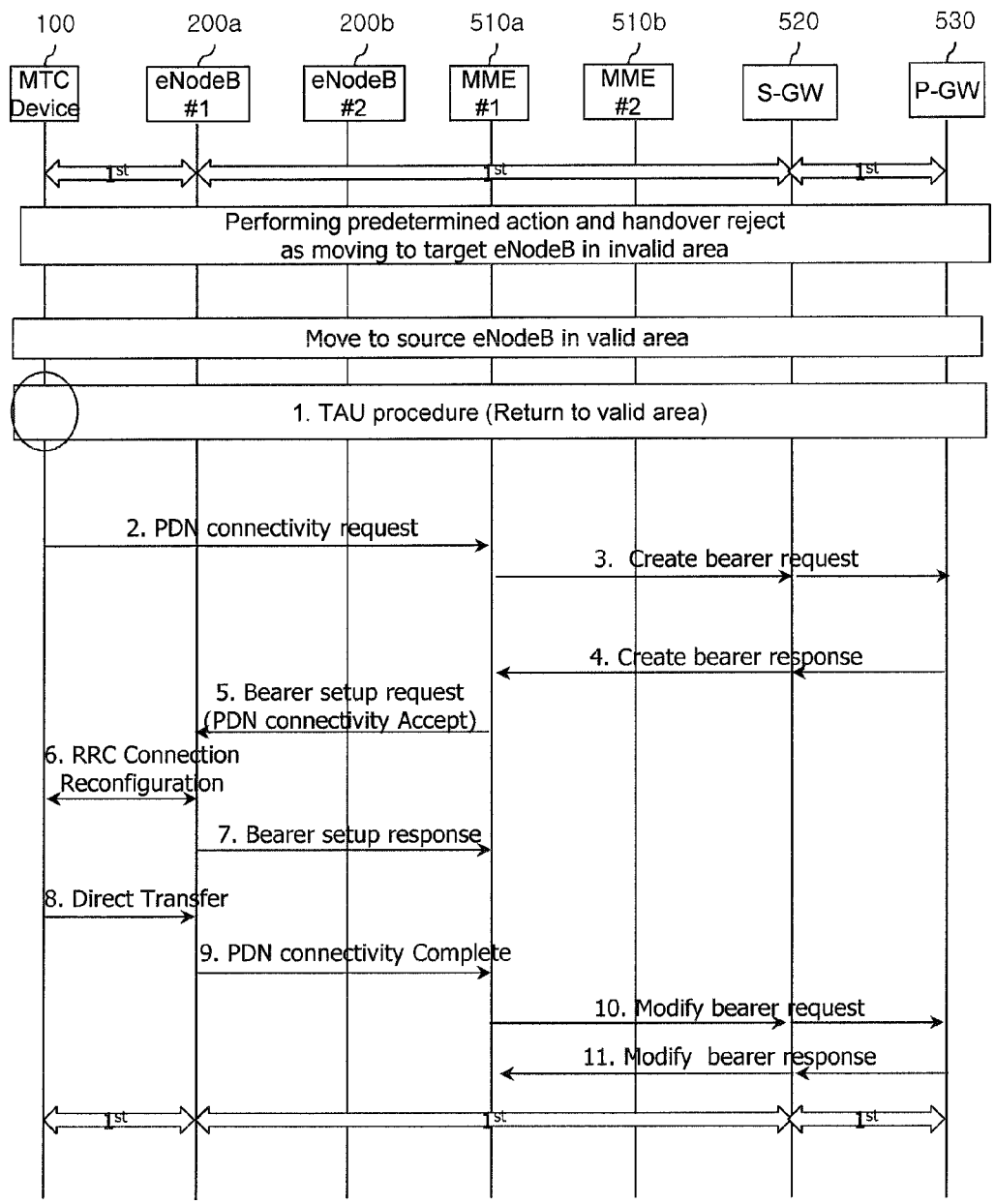
FIG. 18 is a flow chart showing a solution according to a third embodiment of the present specification.

FIG. 18 is a flow chart showing a solution according to a third embodiment of the present specification.

Referring to FIG. 18, while the MTC device 100 establishes one PDN connection with the P-GW 530 via the S-GW 520 through the eNodeB#1 210*a* and transmits and receives data, the MTC device 100 moves into the predetermined coverage of eNodeB#2 210*b*. Then, the handover is rejected according to a predetermined action, and the PDN connection is disconnected.

Later, when the MTC device 100 moves to an eNodeB of an valid area, for example, the eNodeB#1 210*a*, the MTC device 100 immediately performs the PDN connection setup procedure together with the TAU procedure.

Similar processes to FIG. 9 to FIG. 17 are not described among the depicted processes, and only different processes are will be described as below.

Depicted process 1: When the MTC device 100 moves to an eNodeB of an valid area, for example, the eNodeB#1 210*a*, the TAU procedure is started. During the TAU procedure, the MME#1 510*a* recognizes that the PDN connection of the MTC device 100 is disconnected due to performing a previous monitoring action, or there is no PDN connection of which a service is currently valid. That is, the MME#1 510*a* recognizes it based on the history information of monitoring received from the MME#2 510*b* or based on the information directly/indirectly received from subscriber information and another network node (e.g., an MTC server or a network node in charge of a specific function for monitoring).

Therefore, as the MTC device 100 enters into the eNodeB#1 200*a* of valid area again, the MME#1 510 sends the information implicitly indicating entering into the eNodeB#1 200*a* of valid area or the information indicating a PDN connection setup with being included in a TAU accept message (e.g., TAU Accept message) to the MTC device 100.

Depicted process 2: Than, the MTC device 100 may immediately perform the PDN connection setup process in order to setup the disconnected PDN connection again. That is, the MTC device 100 setup the PDN connection which was dropped again even before uplink data is generated, and later, may immediately transmit the data without delayed time if the uplink/downlink data transmission is required.

Figure 19:
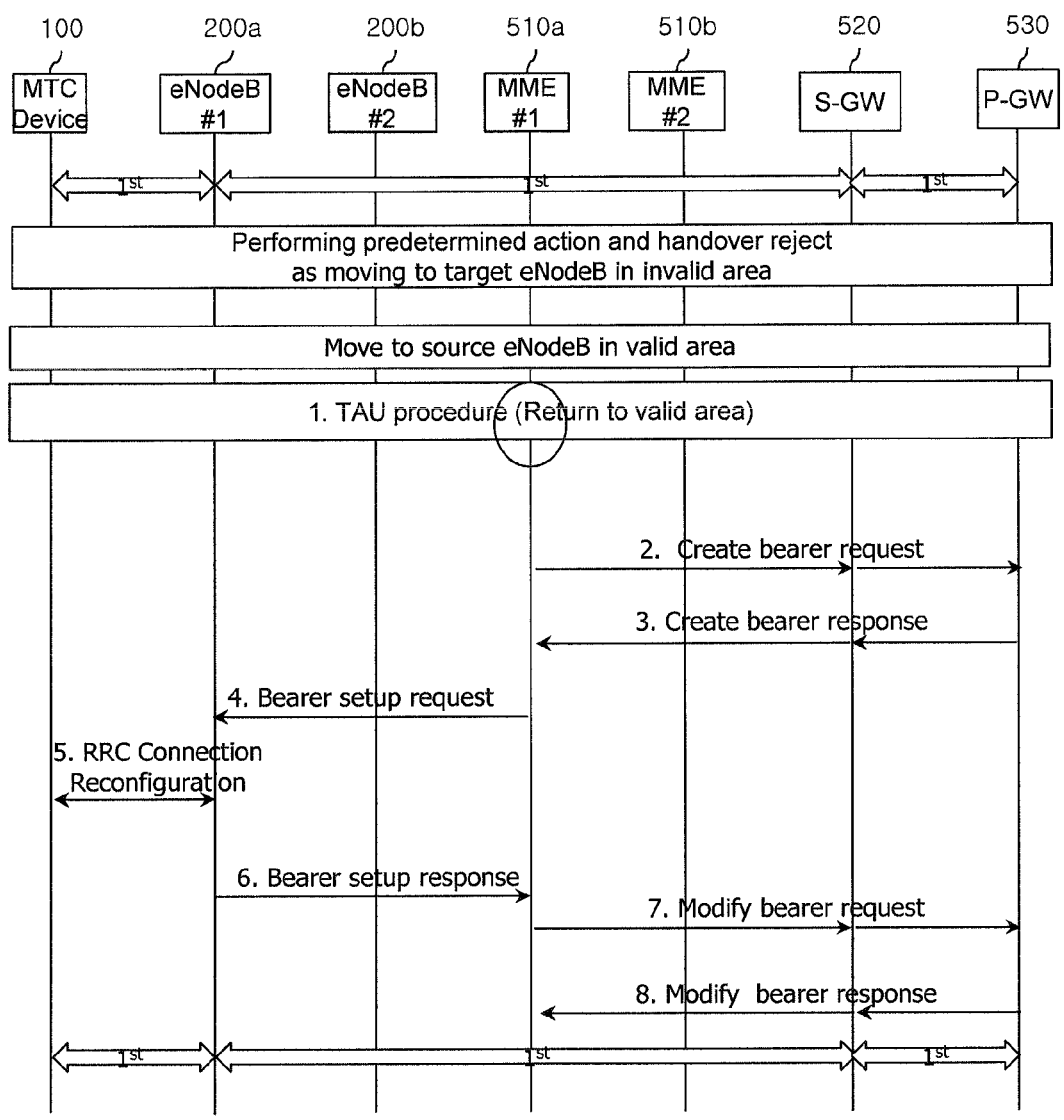
FIG. 19 is a flow chart showing a solution according to a fourth embodiment of the present specification.

FIG. 19 is a flow chart showing a solution according to a fourth embodiment of the present specification.

Referring to FIG. 19, similar to FIG. 18, while the MTC device 100 establishes one PDN connection with the P-GW 530 via the S-GW 520 through the eNodeB#1 210*a* and transmits and receives data, the MTC device 100 moves into the predetermined coverage of eNodeB#2 210*b*. Then, the handover is rejected according to a predetermined action, and the PDN connection is disconnected.

Later, when the MTC device 100 moves to an eNodeB of an valid area, for example, the eNodeB#1 210*a*, a network immediately generates a bearer for the PDN connection setup during the TAU procedure even before downlink data is generated. It is noteworthy that the bearer setup is not performed in a general TAU procedure, but according to the fourth embodiment, the PDN connection may be setup by performing the bearer setup procedure in parallel during the TAU procedure.

Similar processes to FIG. 9 to FIG. 17 are not described among the depicted processes, and only different processes are will be described as below.

Depicted process 1: When the MTC device 100 moves to an eNodeB of an valid area, for example, the eNodeB#1 210*a*, the TAU procedure is started. During the TAU procedure, the MME#1 510*a* recognizes that the PDN connection of the MTC device 100 is disconnected due to performing a previous monitoring action, or there is no PDN connection of which a service is currently valid. That is, the MME#1 510*a* recognizes it based on the history information of monitoring received from the MME#2 510*b* or based on the information directly/indirectly received from subscriber information and another network node (e.g., an MTC server or a network node in charge of a specific function for monitoring).

Depicted process 2: Than, the MME#1 510*a* proceeds with a bearer setup with the P-GW 530 via the S-GW 520 in order to setup the disconnected PDN connection again.

Depicted process 4: In addition, the MME#1 510*a* proceeds with a bearer setup with the eNodeB#1 200*a* in order to setup the disconnected PDN connection again.

Accordingly, the P-GW 530 setup the PDN connection which was dropped again even before downlink data is generated, and later, may immediately transmit the data without delayed time if the uplink/downlink data transmission is required.

The description described so far may be implemented by hardware. This will be described with reference to FIG. 12.

Figure 20:
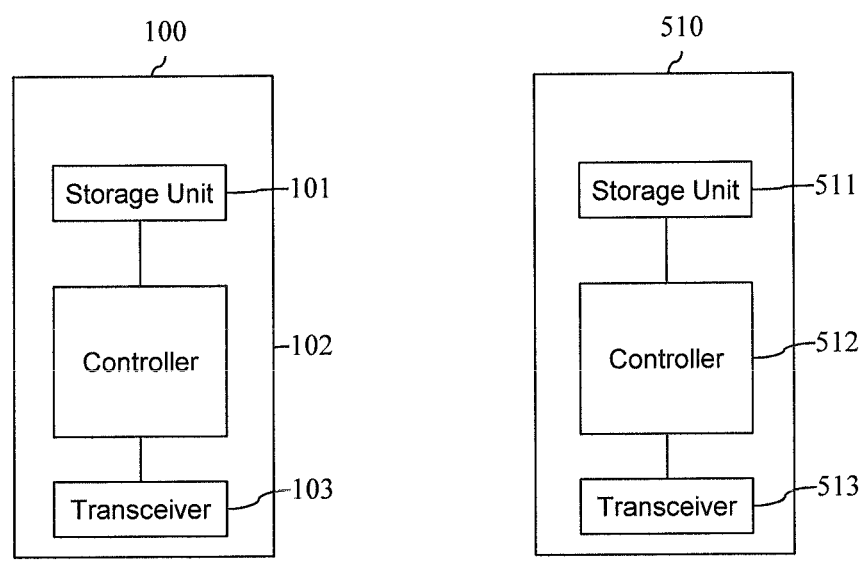
FIG. 20 is a block diagram showing a structure of an MTC device 100 and an MME/SGSN 510 according to an embodiment of the present invention.

FIG. 20 is a block diagram showing a structure of an MTC device 100 and an MME/SGSN 510 according to an embodiment of the present invention.

As shown in FIG. 12, the MTC device 100 includes a storage element 101, a controller 102, and a transceiver 103. Further, the MME/SGSN 510 includes a storage element 511, a controller 512, and a transceiver 513.

The storage elements 101 and 511 store the method of FIG. 8 to FIG. 11.

The controllers 102 and 512 control the storage elements 101 and 511 and the transceivers 103 and 513. More specifically, the controllers 102 and 512 respectively execute the aforementioned methods stored in the storage elements 101 and 511. Further, the controllers 102 and 512 transmit the aforementioned signals via the transceivers 103 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for performing Machine Type Communication (MTC) monitoring, comprising:
    recognizing that at least one bearer was dropped in a target base station as an MTC device, which was progressing a service through one or a plurality of bearers through a Packet Data Network (PDN) connection established via a source base station, moves to the target base station in an invalid area, as a control for a predetermined specific monitoring event;
    transmitting information notifying that the MTC device enters into an valid area or information instructing an activation of bearer to the MTC device, if it is detected that the MTC device gets out of the invalid area and enters into the valid area; and
    performing a process for setup the dropped bearer again.

2. The method of claim 1, wherein if at least one of a plurality of bearers is dropped and other bearer is maintained,
    the information is transmitted with being included in a handover command message.

3. The method of claim 1, wherein if at least one of a plurality of bearers is dropped and other bearer is maintained,
    the information is transmitted with being included in a TAU accept message.

4. The method of claim 1, wherein the step of performing the process includes:
    if the PDN connection is also dropped according to the drop instruction, performing a process for setup the PDN connection.

5. The method of claim 4, wherein the step of transmitting the information includes:
    if the PDN connection is also dropped according to the drop instruction, transmitting the information instructing setup of the PDN connection.

6. The method of claim 1, wherein the step of transmitting the information includes
    if at least one of a plurality of bearers is dropped and Quality of Service (QoS) of other at least one bearer is lowered, transmitting information indicating to raise QoS of the other at least one bearer to a base station or another network node of the valid area.

7. A method for performing Machine Type Communication (MTC) monitoring, comprising:
    progressing a service through one or a plurality of bearers through a Packet Data Network (PDN) connection established via a source base station by an MTC device;
    receiving information notifying that the MTC device enters into an valid area or information instructing an activation of bearer, if the MTC device enters into the valid area again in a state that at least one bearer is dropped as the MTC device moves to the target base station in an invalid area; and
    performing a process for setup the dropped bearer again.

8. The method of claim 7, wherein if at least one of a plurality of bearers is dropped and other bearer is maintained,
    the information is received with being included in a handover command message.

9. The method of claim 7, wherein if at least one of a plurality of bearers is dropped and other bearer is maintained,
    the information is received with being included in a TAU accept message.

10. The method of claim 7, wherein the step of performing the process includes
    if the PDN connection is also dropped, performing a process for setup the PDN connection.

11. The method of claim 10, wherein the step of receiving the information includes:
    if the PDN connection is also dropped, receiving the information instructing setup of the PDN connection.

12. The method of claim 7, wherein the information notifying that the MTC device enters into an valid area or the information instructing an activation of bearer is received from the base station before completely entering into the valid area.

13. The method of claim 7, wherein the information notifying that the MTC device enters into an valid area or the information instructing an activation of bearer is received from the base station in the valid area or a previous base station before entering into the valid area.

* * * * *